(12) United States Patent
Jiang et al.

(10) Patent No.: US 12,265,219 B2
(45) Date of Patent: Apr. 1, 2025

(54) HEAD-UP DISPLAY HAVING A LARGE EXIT PUPIL

(71) Applicant: SHENZHEN QIZE TECHNOLOGY PARTNERSHIP (LIMITED PARTNERSHIP), Shenzhen (CN)

(72) Inventors: Houqiang Jiang, Shenzhen (CN); Tapani Kalervo Levola, Shenzhen (CN); Yisheng Zhu, Shenzhen (CN)

(73) Assignee: SHENZHEN QIZE TECHNOLOGY PARTNERSHIP (LIMITED PARTNERSHIP), Shenzhen (CN)

( * ) Notice: Subject to any disclaimer, the term of this patent is extended or adjusted under 35 U.S.C. 154(b) by 518 days.

(21) Appl. No.: 17/694,704

(22) Filed: Mar. 15, 2022

(65) Prior Publication Data

US 2023/0251485 A1 Aug. 10, 2023

(30) Foreign Application Priority Data

Feb. 10, 2022 (CN) .......................... 202210126091.8

(51) Int. Cl.
*G02B 27/01* (2006.01)
*F21V 8/00* (2006.01)
*G02B 27/00* (2006.01)

(52) U.S. Cl.
CPC ......... *G02B 27/0101* (2013.01); *G02B 6/005* (2013.01); *G02B 27/0081* (2013.01); *G02B 2027/0123* (2013.01)

(58) Field of Classification Search
CPC .. G02B 27/01; G02B 27/017; G02B 27/0101; G02B 27/0172; G02B 27/0176; G02B 27/0081; G02B 6/00; G02B 6/0025; G02B 6/0028; G02B 6/005; G02B 6/0016; G02B 6/0038; G02B 2027/0123; G02B 2027/0125; G02B 2027/0178
See application file for complete search history.

(56) References Cited

U.S. PATENT DOCUMENTS 9,791,703 B1 * 10/2017 Vallius ................... G02B 6/005
2016/0231569 A1 * 8/2016 Levola ............... G02B 27/0081
(Continued)

FOREIGN PATENT DOCUMENTS

| CN | 113219671 A | 8/2021 |
| CN | 113568178 A | 10/2021 |
| CN | 113741036 A | 12/2021 |

*Primary Examiner* — Sultan Chowdhury

(57) ABSTRACT

A display apparatus (500) for displaying a virtual image (VIMG1) includes an expander device (EPE1) to form light beams ($B3_{P1,R}$, $B3_{P2,R}$) of output light (OUT1) by expanding light beams ($B0_{P1,R}$, $B0_{P2,R}$) of input light (IN1), the expander device (EPE1) including a waveguide plate (SUB1), an in-coupling element (DOE1) to form guided light (B1) by coupling input light (IN1) into the waveguide plate (SUB1), and an out-coupling element (DOE3) to form output light (OUT1) by coupling the guided light (B1) out of the waveguide plate (SUB1), wherein the display apparatus (500) includes a base (BASE1) and an actuating mechanism (MOTOR1) to cause rotary and/or oscillatory motion of the waveguide plate (SUB1) with respect to the base (BASE1).

14 Claims, 12 Drawing Sheets

(56) References Cited

U.S. PATENT DOCUMENTS

| | | | |
|---|---|---|---|
| 2016/0234485 A1* | 8/2016 | Robbins | H04N 13/332 |
| 2017/0264872 A1* | 9/2017 | Uragami | H04N 9/3129 |
| 2018/0172991 A1* | 6/2018 | Iwashita | B60J 1/008 |
| 2022/0155591 A1* | 5/2022 | Klug | G02B 27/18 |
| 2022/0390666 A1* | 12/2022 | Pietilae | G02B 6/0076 |

* cited by examiner

HEAD-UP DISPLAY HAVING A LARGE EXIT PUPIL

FIELD OF TECHNOLOGY

The present invention relates to a display apparatus for displaying an image.

BACKGROUND TECHNOLOGY

A known virtual display device comprises an optical engine and a diffractive beam expander. The optical engine forms input light beams, which correspond to a primary image displayed on a miniature display. Each input light beam propagates to a different direction, which corresponds to a different display pixel of the miniature display. The diffractive beam expander forms expanded light beams from the input light beams. The user may observe the displayed virtual image when the expanded light beams impinge on his eye.

The virtual display device has an eye box, which refers to the space where the eye can be positioned to view the displayed virtual image. If the eye is outside the eye box, then the expanded light beams do not impinge on the eye, and the eye cannot see the displayed virtual image.

It is known that the size of eye box can be enlarged by increasing the size of an out-coupling element the diffractive beam expander. However, manufacturing of a large out-coupling element may be difficult and/or expensive.

SUMMARY

An object is to provide a display apparatus. An object is to provide a method for displaying an image, An object is to provide an expander device. An object is to provide a method for expanding a light beam. An object is to provide a vehicle, which comprises the display apparatus.

According to an aspect, there is provided a display apparatus (500) for displaying a virtual image (VIMG1), the display apparatus (500) comprising an expander device (EPE1) to form light beams of output light (OUT1) by expanding light beams of input light (IN1), the expander device (EPE1) comprising a waveguide plate (SUB1), an in-coupling element (DOE1) to form guided light (B1) by coupling input light (IN1) into the waveguide plate (SUB1), and an out-coupling element (DOE3) to form output light (OUT1) by coupling the guided light (B1) out of the waveguide plate (SUB1), wherein the display apparatus (500) comprises a base (BASE1) and an actuating mechanism (MOTOR1) to cause rotary and/or oscillatory motion of the waveguide plate (SUB1) with respect to the base (BASE1).

According to an aspect, there is provided an apparatus according to claim 1.

Other embodiments are defined in the claims.

The scope of protection sought for various embodiments of the invention is set out by the independent claims. The embodiments, if any, described in this specification that do not fall under the scope of the independent claims are to be interpreted as examples useful for understanding various embodiments of the invention.

The display apparatus may comprise an optical engine to form an input image, an expander device to extend exit pupil of the optical engine, and a motor to rotate the expander device. The expander device may be implemented e.g. by diffraction gratings or by reflective facets.

The rotation of the expander device may provide a large light-emitting display region, which is equivalent to a large hypothetical out-coupling element. The area of the display region may be substantially greater than the area of the actual out-coupling elements of the expander device.

The rotating expander device may enlarge the imaging area of the optical engine so that the display apparatus may emit output light from the entire region swept by the out-coupling elements. In this way, a large eye box display effect can be achieved through a small-area exit pupil. The display apparatus may provide a large eye box by using small out-coupling elements.

In an embodiment, the display apparatus may be implemented by using one or more slim out-coupling elements, which have a small height. The expander device having the slim out-coupling elements may be mass-produced rather easily at low costs. The slim out-coupling elements may provide a high image quality.

The display apparatus may comprise an optical engine, a base, and an expander device, which is rotatably arranged with respect to the base. The expander device comprises a waveguide plate, which comprises an in-coupling element and an out-coupling element. The optical engine may provide input light, which corresponds to the input image. The in-coupling element may form guided light coupling input light into the waveguide plate. The guided light may propagate in the waveguide plate towards the out-coupling element. The output element may form output light coupling the guided light out of the waveguide plate. The user may observe the displayed virtual image when the output light impinges on the eye of the user.

In an embodiment, the expander device may be implemented by diffraction gratings. The expander device may comprise a diffractive in-coupling element and a diffractive out-coupling element. The in-coupling element may comprise one or more diffraction gratings. The out-coupling element may comprise one or more diffraction gratings. The diffractive in-coupling element may form guided light by diffracting the input light into the waveguide plate. The diffractive out-coupling element may form the output light by diffracting the guided light out of the waveguide plate. The input light may comprise a plurality of input light beams. The output light may comprise a plurality of output light beams. The grating vector of the in-coupling element and grating vector of the diffractive out-coupling element may be selected such that the directions of the output light beams correspond to the directions of the input light beams. The diffractive elements may e.g. facilitate mass production of the expander devices. The diffractive elements may also preserve high mechanical strength of the waveguide plate.

In an embodiment, the expander device may be implemented by reflective facets. The in-coupling element may comprise one or more reflective facets. The out-coupling element may comprise one or more reflective facets. The out-coupling element may comprise e.g. a plurality of semi-transparent semi-reflective inclined facets, which are embedded in the waveguide plate. The one or more facets of the in-coupling element may form the guided light by reflecting input light into the waveguide plate. The one or more facets of the out-coupling element may form the output light by reflecting the guided light out of the waveguide plate. The inclination angles of the facets may be selected such that the directions of the output light beams correspond to the directions of the input light beams. The reflective facets may e.g. provide high color rendering fidelity when displaying a virtual image, which comprises multiple colors.

In an embodiment, the display apparatus may be a vehicle-mounted head-up display. The display apparatus may be used as a vehicle-mounted head-up display. The large eye box of the display apparatus may facilitate viewing the displayed virtual image e.g. in a situation where the vehicle is driven on a road and the head of the user moves according to the movements of the vehicle.

In an embodiment, the rotating expander device may be dynamically balanced with respect to centrifugal forces. The expander device may also be rotated at a constant angular velocity so as to reduce or minimize mechanical vibrations caused by the rotation. The mechanical vibrations could cause e.g. blurring of the displayed image. The mechanical vibrations could cause e.g. disturbing audible noise.

Rotation at a constant angular velocity may allow a high refresh rate. The refresh rate indicates how many times at least one light-emitting out-coupling element sweeps over a predetermined point of the display area of the display apparatus during a time period. A low refresh rate may cause flickering of the displayed image. A high refresh rate may facilitate providing a flicker-free viewing experience.

In an embodiment, the expander device may comprise two coupling elements. The two out-coupling elements may facilitate balancing the expander device, and/or the two out-coupling elements may increase the refresh rate. For example, the expander device having two out-coupling elements may be rotated at the rotation speed of 60 revolutions per second. In that case, the refresh rate may be equal to 2×60/s=120 output light pulses per second. The refresh rate of 120 pulses per second or higher may facilitate providing a flicker-free viewing experience.

When the rotation speed exceeds the time resolution of the human eye, then the entire display region defined by the rotating expander device may be regarded as a visually uniform display surface.

In an embodiment, the out-coupling elements may be produced by using lithographic techniques. For example, an embossing tool may be produced by e-beam lithography, and the diffraction gratings of the out-coupling elements may be formed by using the embossing tool. Increasing the size of the embossing tool may significantly increase production costs of the embossing tool. The rotating expander device may provide an enlarged display area without the need to increase the size of the embossing tool.

BRIEF DESCRIPTION OF THE DRAWINGS

In the following examples, several variations will be described in more detail with reference to the appended drawings, in which.

DETAILED DESCRIPTION OF THE EMBODIMENTS

Figure 1A:
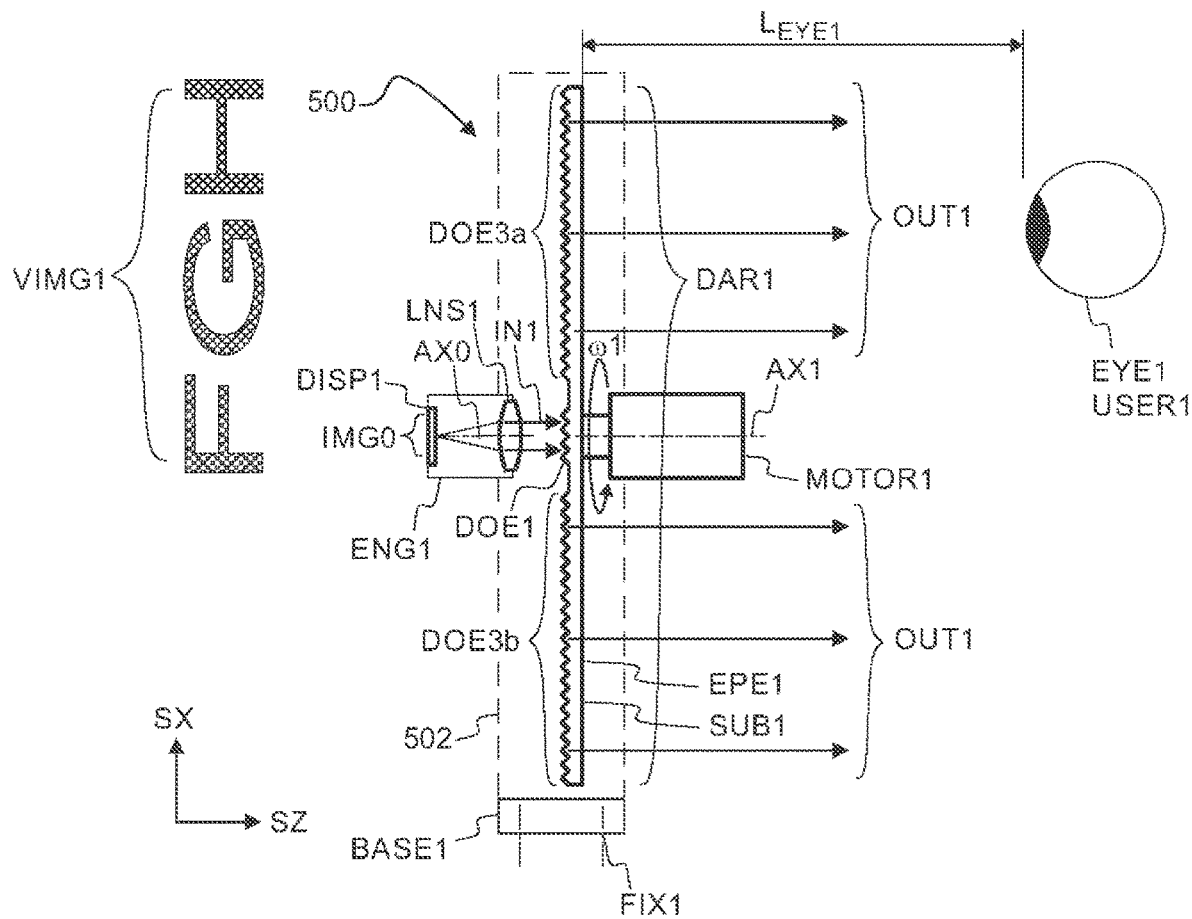
FIG. 1a shows, by way of example, in a side view, the display apparatus.
Figure 1B:
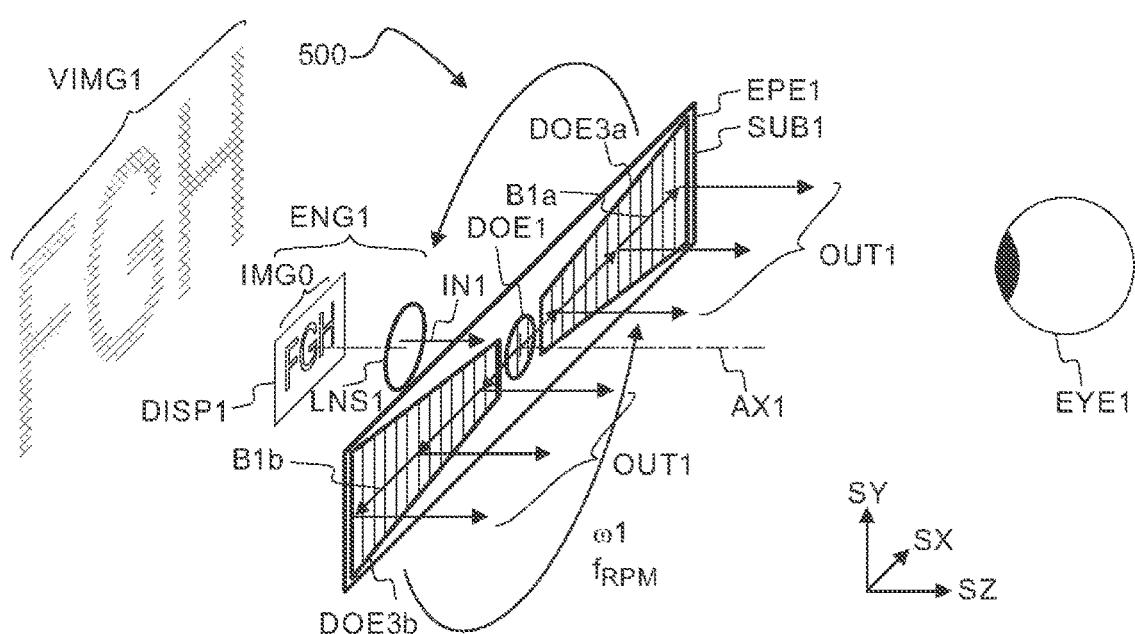
FIG. 1b shows, by way of example, in a three-dimensional view, the display apparatus.

Referring to FIGS. 1a and 1b, the display apparatus 500 may comprise an optical engine ENG1 to form input light IN1, an expander device EPE1 to form output light OUT1 by expanding input light IN1, and a motor MOTOR1 to provide an enlarged display region DAR1 by rotating the expander device EPE1.

A user USER1 of the display apparatus 500 may observe a displayed virtual image VIMG1 when the output light OUT1 impinges on the eye EYE1 of the user.

The input light IN1 may comprise a plurality of light beams propagating in different directions. Each light beam of the input light IN1 may correspond to a different point of the input image IMG0. The input light beams may together constitute input light IN1.

The output light OUT1 may comprise a plurality of light beams propagating in different directions. The output light OUT1 may comprise a plurality of output light beams corresponding to different points of the virtual image VIMG1. The expander device EPE1 may form the output light OUT1 from the input light IN1 such that the directions and the intensities of the light beams of the output light OUT1 correspond to the points of the input image IMG0. The expander device may expand light of the input light beams. The expander device EPE1 may form the output light beams by expanding the input light beams of the input light IN1. In particular, the expander device EPE1 may form the output light beams by diffractively expanding the input light beams. Each output light beam may propagate in the same direction as the corresponding input light beam. Consequently, the displayed virtual image VIMG1 may represent the input image IMG0.

A light beam of the input light TN1 may correspond to a single image point (P0) of a displayed image. The expander device EPE1 may form an output light beam from a light beam of the input light IN1 such that the direction (k3,P0,R) of the output light beam is parallel with the direction (k0,P0,R) of the corresponding light beam of the input light IN1. A light beam corresponding to a different image point may propagate in a different direction. Directions and image points are shown e.g. in FIGS. 4a to 4i.

The optical engine ENG1 may form input light IN1, which corresponds to an input image IMG0. The optical engine ENG1 may form input light TN1, which represents an input image IMG0. The input light IN1 may comprise a plurality of input light beams propagating in different directions corresponding to different image points of the input image IMG0. The optical engine ENG1 may comprise a display DISP1 and collimating optics LNS1 to form the input light beams. The optical engine ENG1 may project the input light IN1 to the in-coupling element DOE1. The optical engine ENG1 may also be called e.g. as a projector.

The expander device EPE1 may comprise a waveguide plate SUB1, which in turn may comprise an in-coupling element DOE1, and one or more out-coupling elements DOE3, DOE3a, DOE3b. The in-coupling element DOE1 may couple the input light IN1 into the waveguide plate SUB1. The input light IN1 may impinge on the in-coupling element DOE1. The input light IN1 may overlap the in-coupling element DOE1. The axis AX1 of rotation may intersect the in-coupling element DOE1. The in-coupling element DOE1 may be concentric with the axis AX1 of rotation.

The elements DOE1, DOE3, DOE3a, DOE3b may be diffractive elements. The in-coupling element DOE1 may form guided light B1, B1a, B1b by diffracting the input light IN1. The guided light B1, B1a, B1b may propagate as waveguided light in the waveguide plate SUB1. The one or more out-coupling elements DOE3, DOE3a, DOE3b may form output light OUT1 by diffracting the guided light B1, B1a, B1b out of the waveguide plate SUB1.

The expander device EPE1 may comprise a substantially planar waveguide plate SUB1, which in turn may comprise a diffractive in-coupling element DOE1, and one or more diffractive out-coupling elements DOE3. For example, the expander device EPE1 may comprise a first out-coupling element DOE3a and a second out-coupling element DOE3b.

Each element DOE1, DOE3, DOE3a, DOE3b may comprise one or more diffraction gratings. The gratings may be e.g. on the first and/or on the second surface of the waveguide plate SUB1.

The expander device EPE1 may comprise one or more out-coupling elements DOE3, DOE3a, DOE3b. The expander device EPE1 may have two out-coupling elements DOE3 (DOE3a, DOE3b) on opposite sides of the in-coupling element DOE1. The in-coupling element DOE1 may form guided light B1, B1a, B1b for the out-coupling elements DOE3, DOE3a, DOE3b. The out-coupling elements DOE3, DOE3a, DOE3b may form output light OUT1 by diffracting the guided light B1, B1a, B1b.

The expander device EPE1 may be arranged to expand a viewing pupil of the display apparatus 500, so as to facilitate keeping the eye in a suitable transverse position with respect to the display apparatus 500.

The expander device EPE1 may be arranged to rotate with respect to a stationary base BASE1. The display apparatus 500 may be mounted e.g. to a vehicle 1000 via the base BASE1. The display apparatus 500 may be mounted to a vehicle 1000 e.g. via one or more joints FIX1. The joints may be e.g. adhesive joints and/or screw joints.

The optical engine ENG1 may have a fixed position with respect to the base BASE1. The optical engine ENG1 may be fixedly mounted to the base BASE1. The optical engine ENG1 may be stationary with respect to the base BASE1. The expander device EPE1 may be arranged to move with respect to the stationary base BASE1. The expander device EPE1 may be rotatable with respect to the stationary base BASE1. The expander device EPE1 may be arranged to rotate and/or oscillate with respect to the stationary base BASE1.

The display apparatus 500 may comprise an actuating mechanism MOTOR1 to cause rotary and/or oscillatory motion of the expander device EPE1 with respect to the stationary base BASE1. The actuating mechanism MOTOR1 may be directly or indirectly connected to the base BASE1. The actuating mechanism MOTOR1 may be connected to the base BASE1 e.g. via a protective cover 502 and/or via a frame. The actuating mechanism MOTOR1 may be e.g. a motor. The actuating mechanism MOTOR1 may be e.g. an electric motor or a pneumatic turbine. The motor MOTOR1 may rotate the expander device EPE1 about an axis AX1 of rotation. The expander device EPE1 may rotate at an angular velocity $\omega_1$, which corresponds to a speed of rotation $f_{RPM}$.

The optical engine ENG1 may be mechanically connected to the base BASE1 e.g. via a protective cover 502. The protective cover may be transparent or semi-transparent. For example, a transparent cover 502 may comprise clear glass or plastic. For example, semi-transparent cover 502 may comprise mesh, which has a see-through property. The protective cover 502 may also prevent the user from accidentally touching the rotating expander device EPE1.

The optical engine ENG1 may be mechanically connected to the base BASE1 also via a connecting structure. In an embodiment, the connecting structure may be an open structure. It is not always necessary to protect the rear side of the rotating expander device EPE1.

The symbol $L_{EYE1}$ denotes the distance between the expander device EPE1 and the eye EYE1 of the user. When using the display apparatus 500 as a head-up display of a vehicle 1000, the distance $L_{EYE1}$ may be e.g. in the range of 0.1 m to 1.0 m.

SX, SY and SZ denote orthogonal directions. The waveguide plate SUB1 may be parallel with a plane defined by the directions SX and SY.

The in-coupling element DOE1 may receive input light IN1, and the out-coupling element DOE3, DOE3a, DOE3b may provide output light OUT1. The input light IN1 may comprise a plurality of light beams propagating in different directions. The output light OUT1 may comprise a plurality of expanded light beams (B3) formed from the light beams (B0) of the input light IN1.

The expander device EPE1 forms an output light OUT1 by expanding input light IN1. The width $w_{OUT1}$ of the light beams of the output light OUT1 may be greater than the width $w_{IN1}$ of the light beams of the input light IN1. The expander device EPE1 may expand the input light IN1 at least in the direction of a grating vector ($V_1$) of the in-coupling element DOE1. The expander device EPE1, when the grating vector ($V_1$) is parallel with the horizontal direction (SX), may expand the input light IN1 in the horizontal direction (SX). The expander device EPE1, when the grating vector ($V_1$) is parallel with the vertical direction (SY), may expand the input light IN1 in the vertical direction (SY).

When rotating, the expander device EPE1 may sequentially increase the horizontal cross-sectional dimension $w_{OUT1}$ and the vertical cross-sectional dimension $h_{OUT1}$ of the output light beams (B3) of the output light OUT1. When rotating, the expander device EPE1 may effectively expand the input light IN1 in two dimensions (e.g. in the direction SX and in the direction SY). The expansion process may also be called as exit pupil expansion. The expander device EPE1 may be called as a beam expander device or as an exit pupil expander.

The in-coupling element DOE1 may form guided light B1 by coupling input light IN1 into the waveguide plate SUB1. The in-coupling element DOE1 may form guided light B1a, B1b by coupling input light IN1 into the waveguide plate SUB1. The guided light B1, B1a, B1b may be waveguided within the planar waveguide plate SUB1, The B1, B1a, B1b may be confined to the plate SUB1 by total internal reflection. The term "guided" may mean that the light propagates within the planar waveguide plate SUB1 so that the light is confined to the plate by total internal reflection (TIR). The waveguide plate SUB1 operates as a light guide. The term "guided" may mean the same as the term "waveguided".

An out-coupling element DOE3 may form output light OUT1 by coupling guided light B1 out of the waveguide plate SUB1. A first out-coupling element DOE3a may form first output light OUT1 by coupling first guided light B1a out of the waveguide plate SUB1. A second out-coupling element DOE3b may form second output light OUT1 by coupling second guided light B1b out of the waveguide plate SUB1.

The display apparatus 500 may comprise a diffractive waveguiding beam expander device EPE1, and a base BASE1. The expander device EPE1 may comprise a waveguide plate SUB1, an in-coupling element DOE1 to diffract input light IN1 into the waveguide plate SLB1, and an out-coupling element DOE3 to form output light OUT1 by diffracting light B1 out of the waveguide plate SUB1. The waveguide plate SUB1 may comprise the elements DOE1, DOE3. The elements DOE1, DOE3 may be implemented on the waveguide plate SUB1, The in-coupling element DOE1 and/or the out-coupling element DOE3 may be e.g. a blazed diffraction grating. The expander device EPE1 may also comprise a first in-coupling element DOE1a and a second in-coupling element DOE1b, which may have different diffractive properties. For example, the first in-coupling element DOE1a may be arranged to diffract light for a first out-coupling element DOE3a, and the second in-coupling element DOE1b may be arranged to diffract light for a second out-coupling element DOE3b (see FIG. 7d).

Figure 1C:
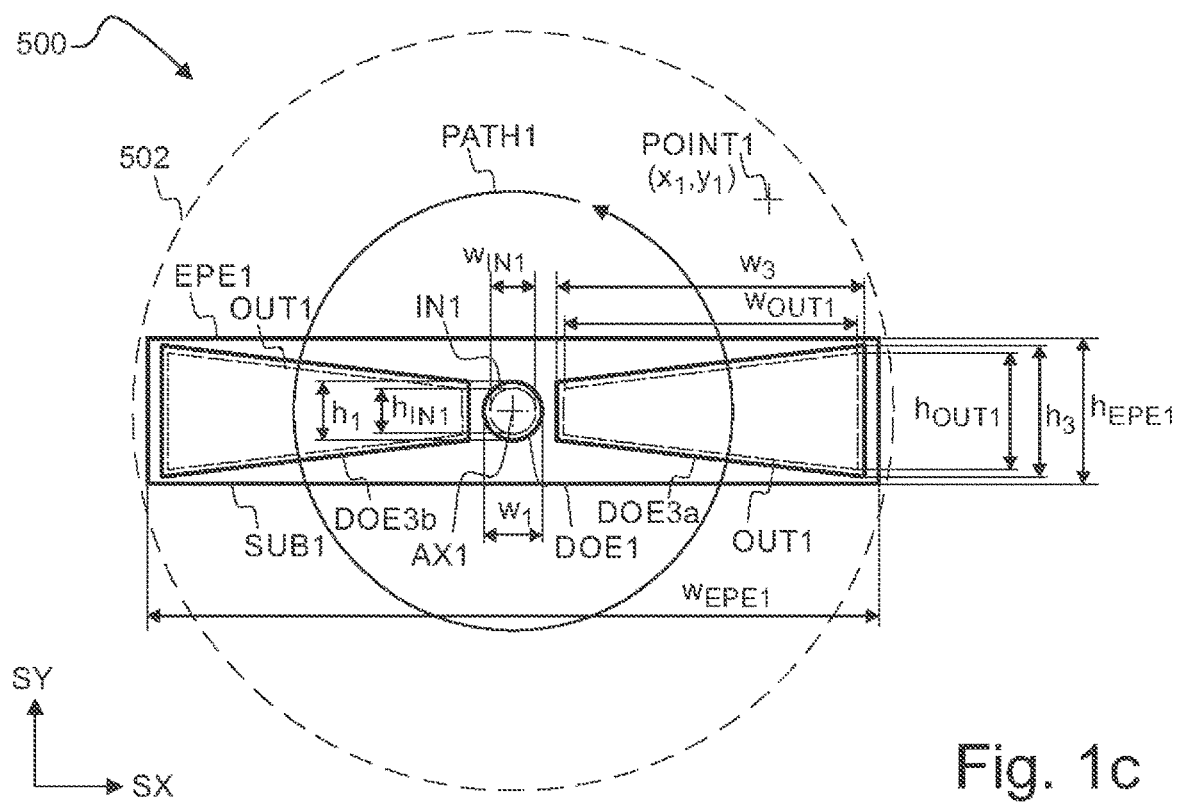
FIG. 1c shows, by way of example, in an axial view, the display apparatus.
Figure 1D:
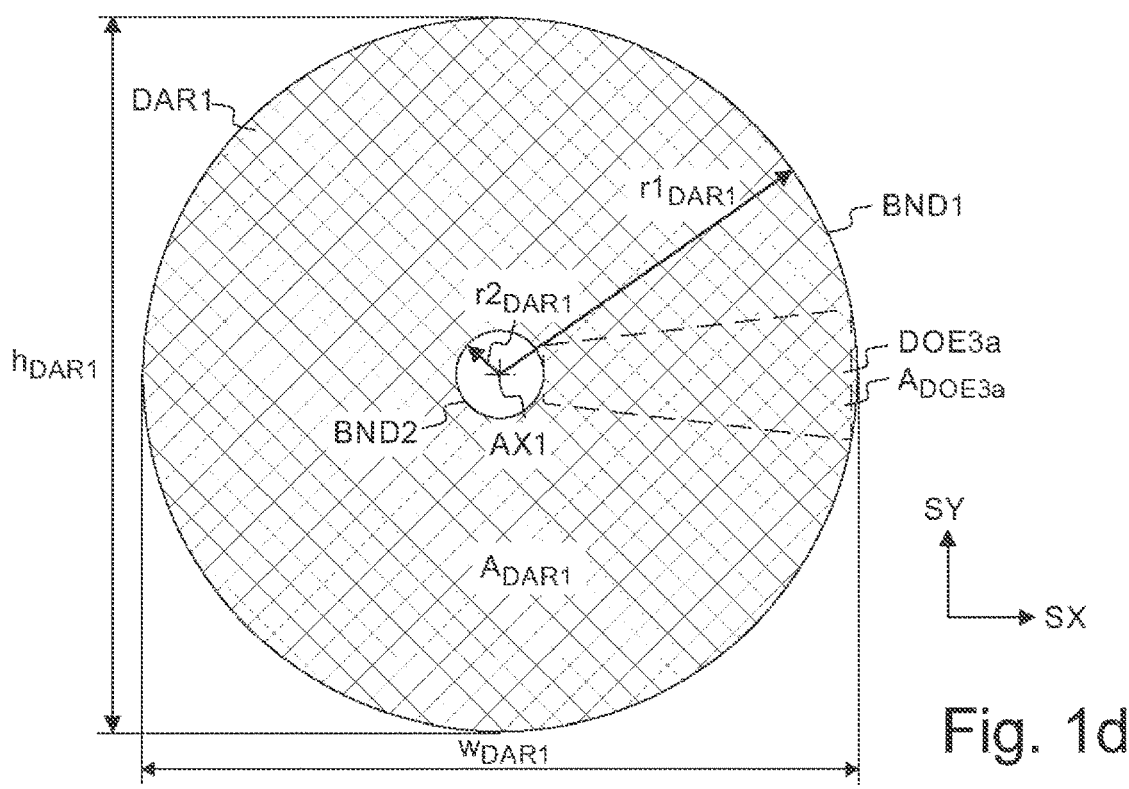
FIG. 1d shows, by way of example, in an axial view, an effective display region formed by rotating out-coupling elements.

Referring to FIGS. 1c and 1d, the one or more out-coupling elements DOE3, DOE3a, DOE3b of the expander device may generate a large display region DAR1 by sweeping along a circular path PATH1 around the axis AX1 of rotation. An arbitrary point (e.g. POINT1) of the display region DAR1 may have a fixed position ($x_1,y_1$) with respect to the base BASE1. ($x_1,y_1$) may denote e.g. the position coordinates with respect to the stationary base BASE1. The arbitrary point (POINT1) may emit output light OUT1 in a pulsed manner when the expander device EPE1 rotates so that said point (POINT1) is within the area of an out-coupling element (e.g. DOE3a). The emission of output light OUT1 from said point (POINT1) may be periodically stopped when the out-coupling element (e.g. DOE3a) moves so that the point (POINT1) is outside the area of the out-coupling elements (DOE3a, DOE3b). The speed of rotation ($f_{RPM}$) may be selected to be high enough so as to reduce or avoid visually detectable flickering of said point (POINT1) of the display region (DAR1).

Each point of the display region DAR1 may sequentially emit output light OUT1 in a pulsed manner when the out-coupling elements DOE3, DOE3a, DOE3b sweep over said point. The one or more out-coupling elements DOE3, DOE3a, DOE3b may form an annular display region DAR1 by sweeping along the circular path PATH1. The whole display region DAR1 may emit output light OUT1 in a pulsed manner.

The symbol $w_{EPE1}$ denotes the width of the expander device EPE1 (in the horizontal direction SX, in a situation where the grating vectors of the elements DOE3, DOE3a, DOE3b are parallel with the direction SX), $h_{EPE1}$ denotes the height of the expander device EPE1 (in the vertical direction SY). $w_{DAR1}$ denotes the width of the display region DAR1, $h_{DAR1}$ denotes the height of the display region DAR1. $A_{DAR1}$ denotes the effective surface area of the display region DAR1. $A_{DOE3}$ denotes the surface area of an out-coupling element DOE3 (or DOE3a). The effective surface area $A_{DAR1}$ of the display region DAR1 may be greater than the surface area $A_{DOE3}$ of the out-coupling element DOE3 (or DOE3a).

In an embodiment, the expander device EPE1 and/or the motor MOTOR1 may block a central region of the display region DAR1, so that the display region DAR1 has a dark center. The display region DAR1 may be e.g. an annular region, which is defined by an inner boundary BND2 and by an outer boundary BND1. The inner boundary BND2 may have a radius $r2_{DAR1}$. The outer boundary BND1 may have a radius $r1_{DAR1}$. The boundaries BND1, BND2 may be concentric with the axis AX1 of rotation.

Figure 8A:
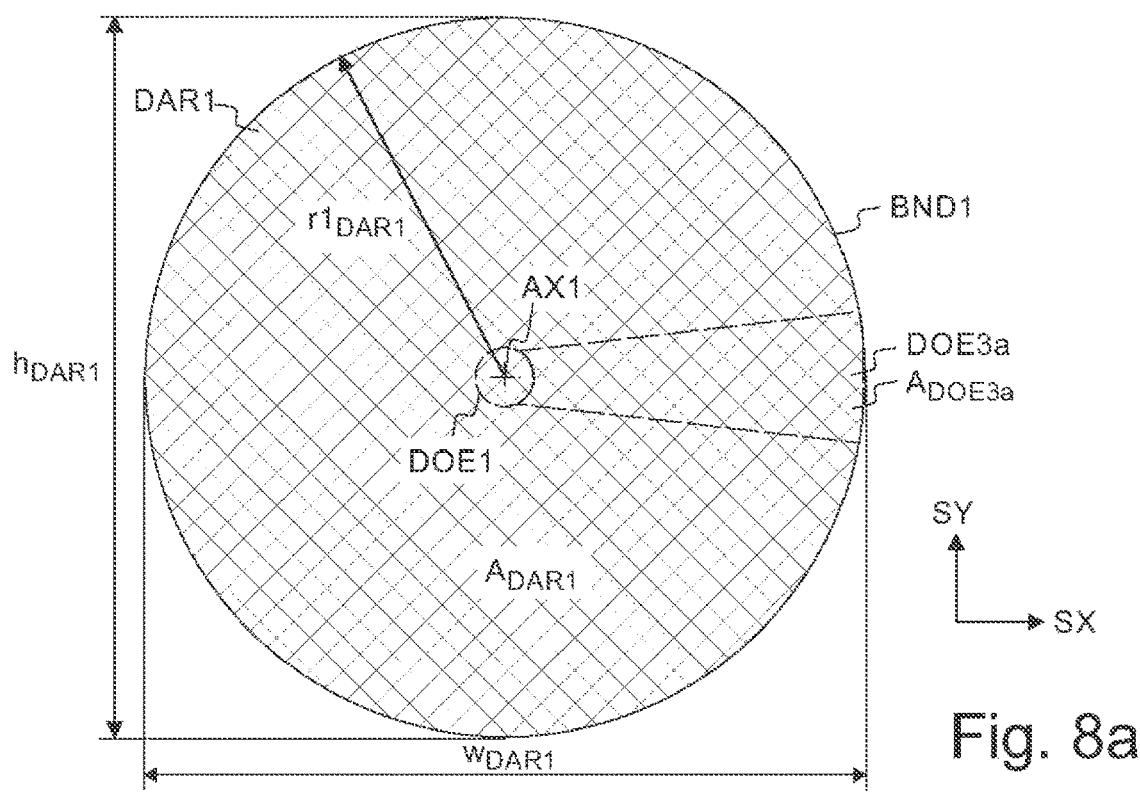
FIG. 8a shows, by way of example, in an axial view, an effective display region formed in a situation where also the in-coupling element provides output light in addition to the out-coupling elements.

In an embodiment, also the center region of the expander device EPE1 may be arranged to provide output light OUT1 so that the circular display region DAR1 does not have a dark center (FIG. 8a).

The radius $r1_{DAR1}$ of the outer boundary BND1 may be e.g. in the range of 4 cm to 25 cm. The width $w_{EPE1}$ of the expander device EPE1 may be e.g. in the range of 8 cm to 50 cm. The surface area $A_{DAR1}$ of the display region DAR1 may be e.g. in the range of 100 cm$^2$ to 2000 cm$^2$.

In an embodiment, the maximum length $w_{EPE1}$ of the waveguide plate may be e.g. in the range of 50 mm to 200 mm. Rotation of the waveguide plate may cause centrifugal forces. The magnitude of the centrifugal forces may depend on the rotation speed and on the diameter. Keeping the length $w_{EPE1}$ smaller than or equal to 200 mm may reduce the risk of damaging the waveguide plate due to centrifugal forces, when rotating the waveguide plate at a high rotation speed.

$w_1$ denotes the width of the in-coupling element DOE1. $h_1$ denotes the height of the in-coupling element DOE1. $w_{IN1}$ denotes the cross-sectional width of the input light beams (IN1). $h_{IN1}$ denotes the cross-sectional height of the input light beams (IN1). $w_3$ denotes the width of the out-coupling element DOE3 (DOE3a). $h_3$ denotes the height of the out-coupling element DOE3 (DOE3a). $w_{OUT1}$ denotes the cross-sectional width of the output light beams (OUT1). $h_{OUT1}$ denotes the cross-sectional height of the output light beams (OUT1). In an embodiment, the cross-sectional dimensions of the output light OUT1 may be defined by the dimensions of the out-coupling element DOE3 (DOE3a). The width $w_{OUT1}$ may be substantially equal to the width $w_3$ and/or the height $h_{OUT1}$ may be substantially equal to the height $h_3$.

The expander device EPE1 may be rotatable relative to the base BASE1. The optical axis AX0 of the optical engine ENG1 may coincide with the axis AX1 of rotation of the expander device EPE1. The optical axis AX0 may be coaxial with the axis AX1 of rotation. The in-coupling element DOE1 may be concentric with the axis AX1 of rotation.

The actuating mechanism MOTOR1 may be arranged to rotate the waveguide plate SUB1 at a rotation speed $f_{RPM}$, which is e.g. in the range of 5 to 200 revolutions per second.

For example, the motor MOTOR1 may be arranged to rotate the expander device EPE1 so that the rotation speed $f_{RPM}$ of the expander device EPE1 is greater than or equal to 30 revolutions per second. Consequently, it may be difficult to visually detect flickering of the displayed image VIMG1.

For example, the motor MOTOR1 may be arranged to rotate the expander device EPE1 so that the rotation speed $f_{RPM}$ of the expander device EPE1 is greater than or equal to 60 revolutions per second. Consequently, it may be more difficult to visually detect flickering of the displayed image VIMG1.

In an embodiment, the expander device EPE1 may be rotatably supported by the one or more bearings of the motor MOTOR1.

Figure 8B:
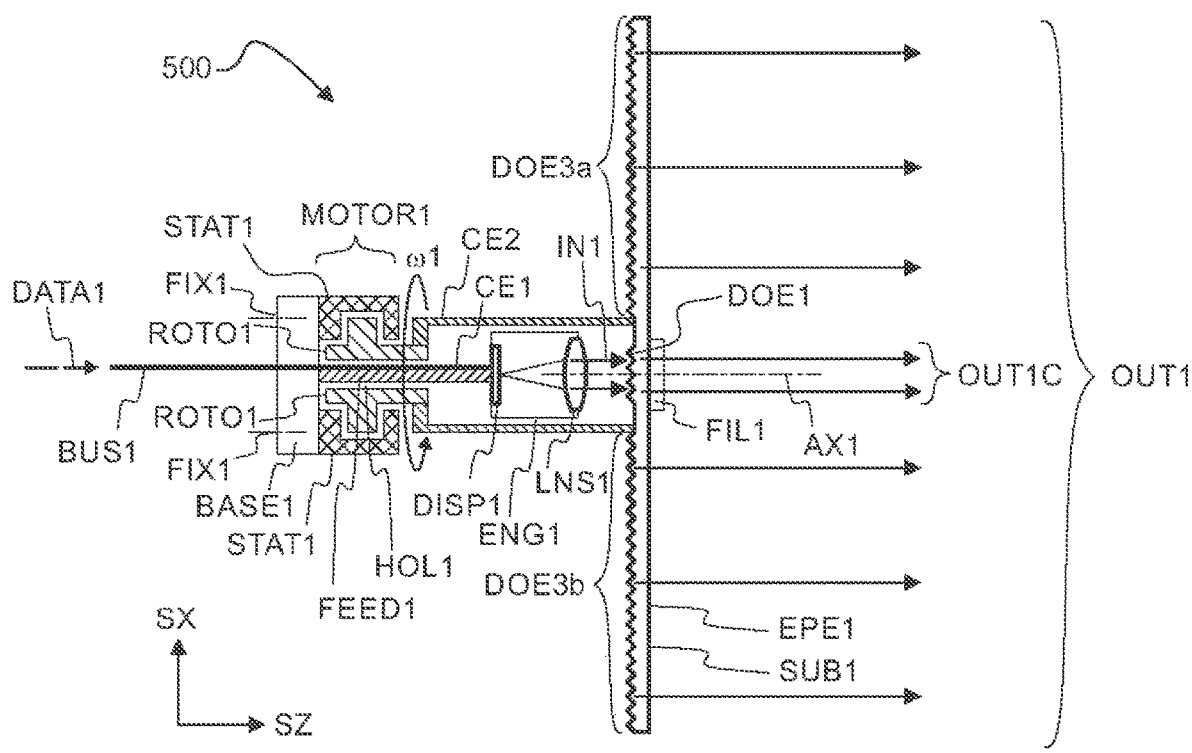
FIG. 8b shows, by way of example, in a side view, the display apparatus, wherein the motor and the optical engine are on the same side of the expander device.
Figure 8C:
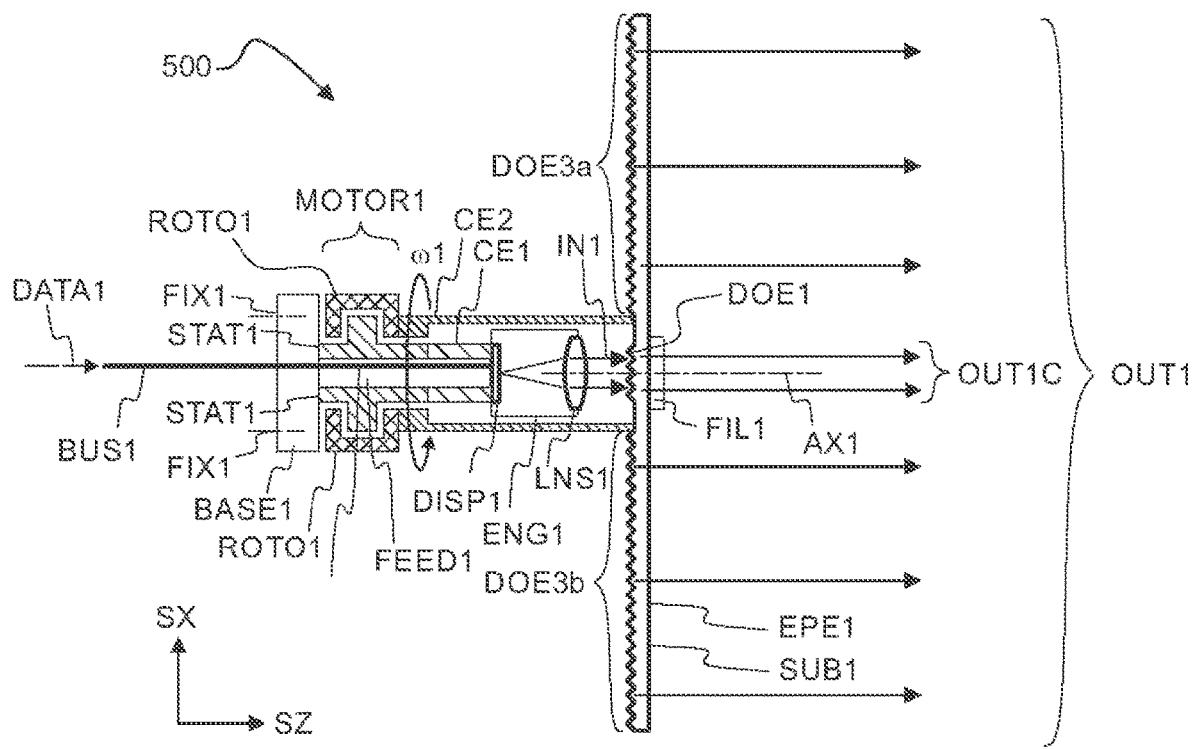
FIG. 8c shows, by way of example, in a side view, the display apparatus, wherein the motor and the optical engine are on the same side of the expander device.

The motor MOTOR1 and the optical engine ENG1 may be on different sides of the expander device EPE1 (FIG. 1a) or on the same side of the expander device EPE1 (FIGS. 8b, 8c). For example, the motor MOTOR1 may have a central opening (HOL1), so as to allow positioning the motor MOTOR1 and the optical engine ENG1 on the same side of the expander device EPE1.

In an embodiment, the expander device EPE1 may operate as a rotating part of the MOTOR1. For example, the expander device EPE1 may comprise magnets or coils to cause a rotating force. The expander device EPE1 may also be rotatably supported by a bearing located at the rim or by a needle bearing located at the axis of rotation AX1.

Figure 2A:
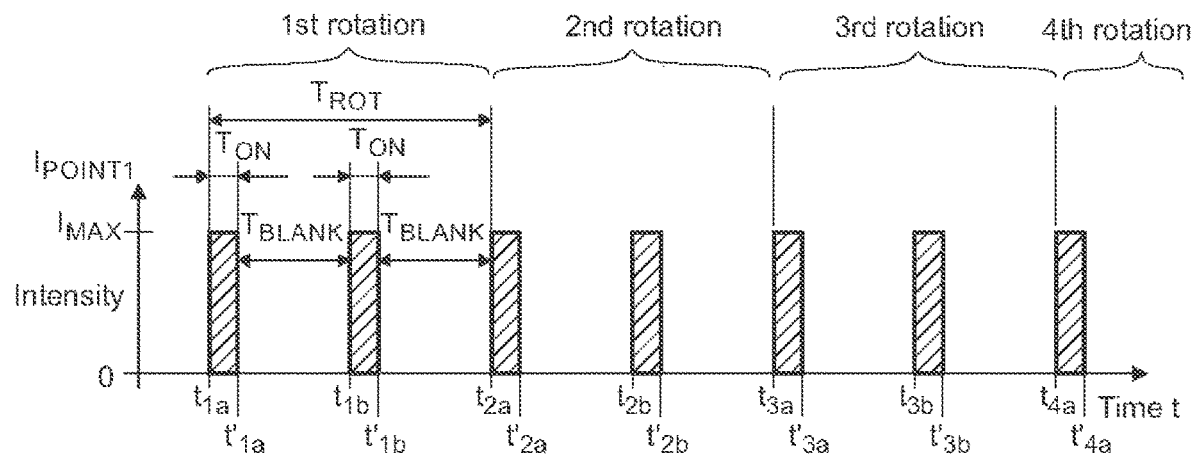
FIG. 2a shows, by way of example, a timing diagram for light emission from a predetermined point of the display region.

FIG. 2a shows, by way of example, a timing diagram for the local intensity $I_{POINT1}$ of an arbitrary point (e.g. POINT1) of the display region DAR1, when displaying a virtual image VIMG1. The point POINT1, appears to emit light to the eye EYE1 in a pulsed manner when the expander device EPE1 rotates. In this example, the expander device EPE1 comprises two out-coupling elements DOE3a and DOE3b. The intensity of the point POINT1 reaches a maximum value $I_{MAX}$ when the point POINT1 overlaps the out-coupling element DOE3a or DOE3b. The intensity of the point POINT1 is zero when the point POINT1 does not overlap the out-coupling element DOE3a or DOE3b. $T_{ROT}$ denotes a time period for one full rotation of the expander device EPE1. The time period $T_{ROT}$ is equal to $1/f_{RPM}$. $T_{ON}$ denotes a time period during which the point POINT1 is within the area of a moving out-coupling element DOE3a or DOE3b. The symbol $T_{ON}$ also denotes the duration of a light pulse emitted from the point POINT1 when the out-coupling element DOE3a or DOE3b sweeps over said point POINT1. $T_{BLANK}$ denotes a time period during which the point POINT1 is outside the area of the out-coupling elements DOE3a and DOE3b. The point POINT1 is within the area of the first out-coupling element DOE3a between times $t_{1a}$, $t'_{1a}$, between times $t_{2a}$, $t'_{2a}$, between times $t_{3a}$, $t'_{3a}$, and between times $t_{4a}$, $t'_{4a}$. The point POINT1 is within the area of the second out-coupling element DOE3b between times $t_{1b}$, $t'_{1b}$, between times $t_{2b}$, $t'_{2b}$, and between times $t_{3b}$, $t'_{3b}$.

The optical engine ENG1 may be arranged to simultaneously project red light, green light, and blue light, so as to display a multi-color image VIMG1.

The optical engine ENG1 may be arranged to project only one color (e.g. red, green or blue). The expander device may be arranged to display a single-color image VIMG1.

Figure 2B:
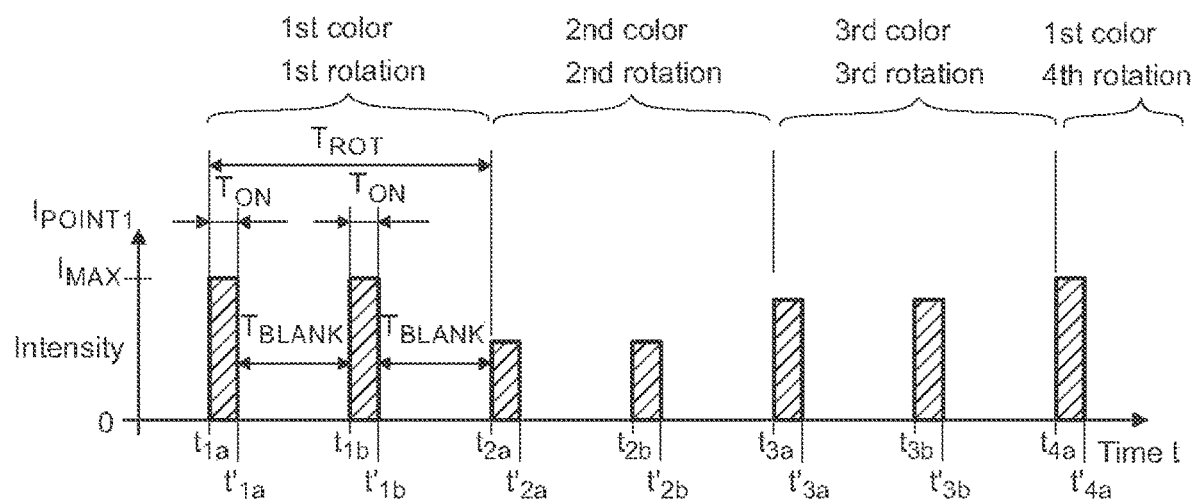
FIG. 2b shows, by way of example, a timing diagram for RGB light emission from a predetermined point of the display region.

FIG. 2b shows, by way of example, a timing diagram for displaying a multi-color virtual image VIMG1. The multi color image may be e.g. an RGB image, which comprises red (R) light, green (G) light, and blue (B) light. The display apparatus 500 may sequentially emit different colors, so as to display a multi-color virtual image VIMG1. For example, the display apparatus 500 may display a first color during a first rotation of the expander device EPE1, a second color during a second rotation, and a third color during a third rotation. The display apparatus 500 may repeat the sequence e.g. after three rotations. The display apparatus 500 may display the first color again during a fourth rotation. The first color may be e.g. red color (R). The second color may be e.g. green color (G). The third color may be e.g. blue color (B). The emitted intensity may be changed between the rotations, so as to provide a desired RGB color.

The optical engine ENG1 may be arranged to sequentially project red light, green light, and blue light. For example, the optical engine ENG1 may be arranged to sequentially project a first color during a first rotation of the expander device EPE1, the optical engine ENG1 may be arranged to sequentially project a second color during a second consecutive rotation of the expander device EPE1, the optical engine ENG1 may be arranged to sequentially project a third color during a third consecutive rotation of the expander device EPE1.

Figure 3A:
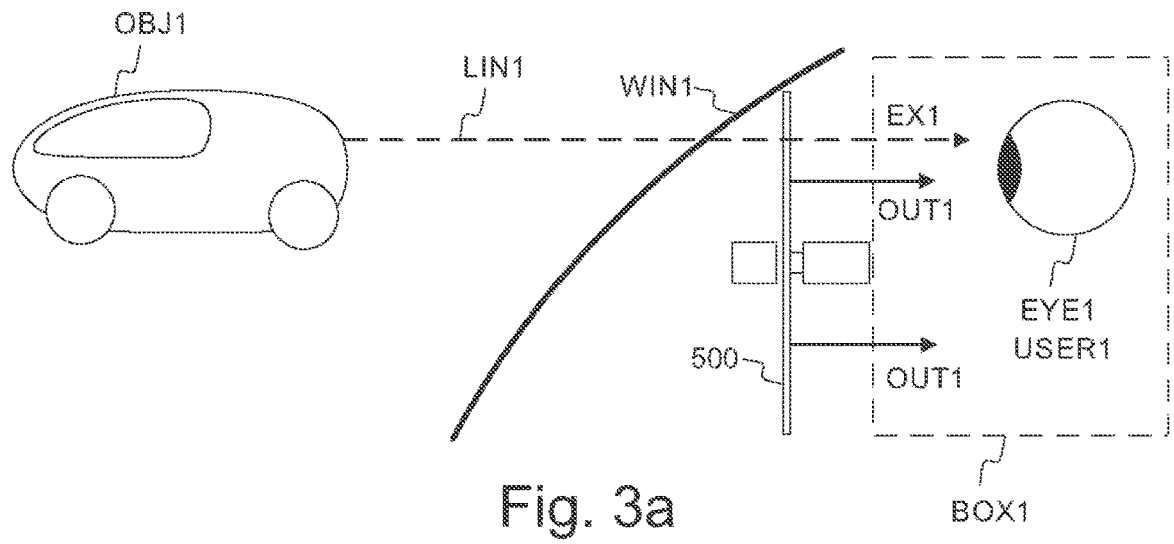
FIG. 3a shows, by way of example, in a side view, observing an external object through a window of a vehicle.
Figure 3B:
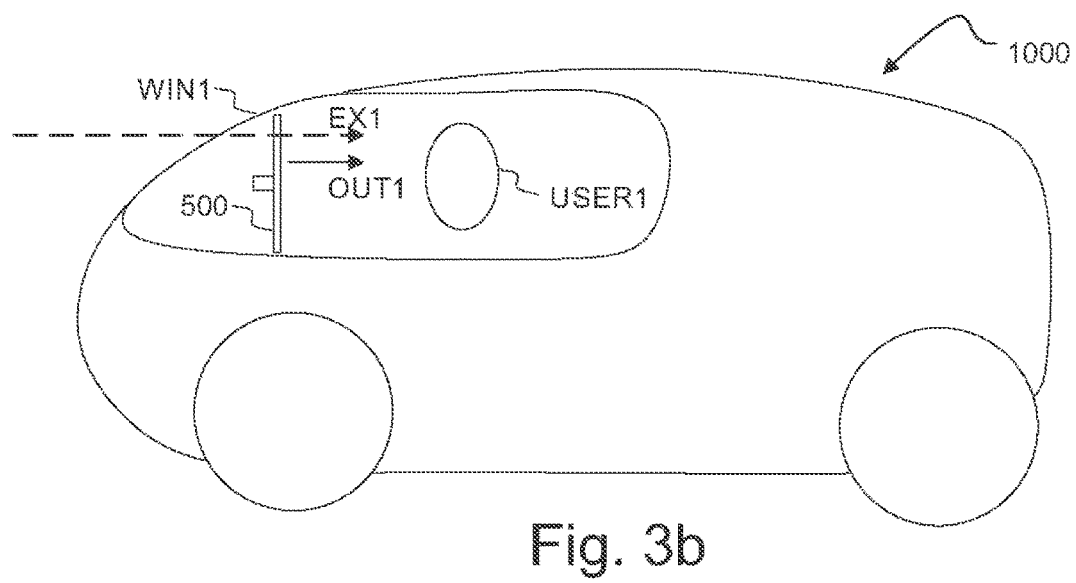
FIG. 3b shows, by way of example, in a side view, receiving external light from the external object through the window of the vehicle.
Figure 3C:
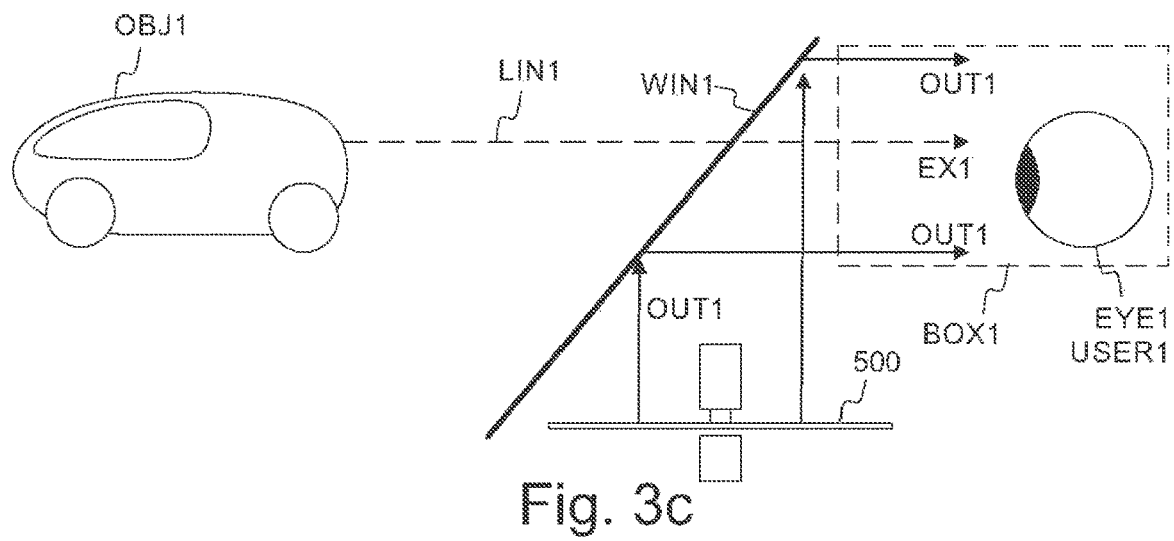
FIG. 3c shows, by way of example, in a side view, observing an external object through a window of a vehicle, wherein the window is also arranged to reflect output light towards the eye of a user.

Referring to FIGS. 3a to 3c, the display apparatus 500 may be a vehicle-mounted head-up display. A vehicle 1000 may comprise the display apparatus 500. The vehicle may be e.g. an electric car propelled by an electric motor. The vehicle may be e.g. a car propelled by an internal combustion engine. The vehicle may be e.g. a motorcycle. The vehicle may be e.g. a tram. The vehicle may be e.g. a train.

When driving a vehicle, a driver USER1 may need to observe information related to the driving. The display apparatus 500 of the vehicle may be arranged to display information about the speed of the vehicle, status of a battery, status of a motor of the vehicle, and/or navigation instructions, for example. The user USER1 of the display apparatus 500 may be the driver or a passenger of the vehicle. The user USER1 may see real objects OBJ1 and/or environment through the display region DAR1, in addition to the displayed virtual images VIMG1. When using the display apparatus 500, the driver USER1 does not need to look down at the dashboard in order to observe the displayed information. When using the display apparatus 500, the driver USER1 may continuously observe the environment through the windscreen of the vehicle, without a need to look down. Avoiding the need to look down may improve driving safety. The displayed virtual image VIMG1 may represent the information, which is related to the driving. The virtual image VIMG1 formed by the display apparatus 500 may fall in front of the driver's line of sight LIN1, so that driver USER1 can observe displayed information and external objects at the same time. The driver's line of sight LIN1 may intersect the effective display area DAR1 of the display apparatus 500.

Rotation of the expander device EPE1 may provide a larger display region DAR1 by using smaller out-coupling elements. This may provide a large eye box BOX1 for the user USER1. The user may observe the displayed virtual image VIMG1 as long as the eye EYE1 of the user remains within the eye BOX1 of the display apparatus 500. The rotating expander device EPE1 may provide a uniform spatial intensity distribution for the output light OUT1. The rotating expander device EPE1 may provide a high image quality. The smaller out-coupling elements may be easier and/or cheaper to produce than large out-coupling elements.

The large display region DAR1 may also facilitate displaying a virtual image VIMG1, which has a large angular width $\Delta\varphi$ and/or a large angular height $\Delta\theta$. Thanks to the large display region, the user may see the whole virtual image VIMG1, or at least a large part of the virtual image VIMG1 also when the distance between the eye EYE1 and the expander device EPE1 is large. The virtual image VIMG1 may cover a large field of view. The virtual image VIMG1 may comprise e.g. vehicle information and/or navigation information.

The display apparatus 500 may be mounted to the vehicle 1000 via the base BASE1. For example, the base BASE1 may be mounted to the window WIN1, to a dashboard, or to a ceiling of a vehicle 1000.

The eye EYE1 of the user USER1 may receive external light EX1 from an external object OBJ1. The user USER1 may observe the external object OBJ1 when the external light EX1 impinges on the eye EYE1. The external light EX1 may propagate through the window WIN1 and through the display area DAR1 of the apparatus 500 to the eye EYE1 of the user USER1. The user USER1 may simultaneously observe the external object OBJ1 and the displayed virtual image VIMG1.

Referring to FIG. 3c, the window WIN1 may be arranged to operate as a part of the display apparatus 500. The window WIN1 may be e.g. the windscreen of the vehicle 1000. The window WIN1 may reflect the output light OUT1 towards the user EYE1 so that the user may view the displayed virtual image VIMG1, wherein the user EYE1 may simultaneously observe the environment of the vehicle 1000 through the window WIN1. For example, the line of sight LIN1 from the external object OBJ1 to the eye EYE1 may intersect the display area DAR1. For example, the user may observe an external object OBJ1 through the window WIN1 so that the displayed virtual image VIMG1 may visually overlap the external object OBJ1. The driver may be visually immersed in the environment of the vehicle while viewing the displayed virtual image so that the driver does not need to look down.

The window WIN1 may be a planar (flat) transparent window or a curved transparent window. The planar window may reflect the output light OUT1 without deforming the displayed virtual image VIMG1.

A curved window may deform the displayed virtual image VIMG1. The display apparatus 500 may be arranged to at least partly compensate deformation of the virtual image VIMG1.

The window WIN1 may simultaneously transmit external light EX1 and reflect output light OUT1 to the eye EYE1 of the user USER1. The window WIN1 may operate as a semi-transparent reflector, which may simultaneously transmit external light EX1 and reflect output light OUT1. The external light EX1 may propagate through the window WIN1 to the eye EYE1.

In an embodiment, the window WIN1 may be coated with a semi-transparent reflective coating, e.g. in order to increase the intensity of the reflected output light. The coating may be e.g. a dielectric or metallic coating.

In an embodiment, the semi-transparent reflective window WIN1 may also operate based on Fresnel reflection caused by the difference between the refractive index of the window and the refractive index of air. The semi-transparent reflective window WIN1 does not need to comprise a reflective coating.

Referring to FIGS. 4a to 4e, the expander device EPE1 may form output light OUT1 by expanding input light IN1 formed by the optical engine ENG1.

The optical engine ENG1 may comprise a display DISP1 and collimating optics LNS1. The display DISP1 may be arranged to display an input image IMG0. The display DISP1 may also be called e.g. as a micro display. The display DISP1 may also be called e.g. as a spatial intensity modulator. The input image IMG0 may also be called e.g. as a primary image.

The input image IMG0 may comprise a center point P0 and four corner points P1, P2, P3, P4. P1 may denote an upper left corner point. P2 may denote an upper right corner point. P3 may denote a lower left corner point. P4 may denote a lower right corner point. The input image IMG0 may comprise e.g. the graphical characters "F", "G", and "H". The input image IMG0 may represent displayed information.

The input image IMG0 may be e.g. a single-color image. A single-color image IMG0 may be formed e.g. by modulating laser light or by modulating light obtained from one or more light emitting diodes.

The input image IMG0 may also be a multi-color image. The input image IMG0 may be e.g. an RGB image, which may comprise a red partial image, a green partial image, and a blue partial image. Each image point may provide e.g. red light, green light and/or blue light.

The optical engine ENG1 may provide input light IN1, which may comprise a plurality of substantially collimated light beams (B0). For example, each red light beam may propagate in a different direction and may correspond to a different point of the input image IMG0. Each light beam may have a color. For example, the subscript "R" may refer to the red color. For example, a red light beam $B0_{P1,R}$ may correspond to an image point P1, and may propagate in the direction of a wave vector $k0_{P1,R}$. The red light beam corresponding to the image point P1 may propagate in the direction specified by the wave vector $k0_{P1,R}$.

A red light beam $B0_{P2,R}$ may correspond to an image point P2, and may propagate in the direction of a wave vector $k0_{P2,R}$. A red light beam $B0_{P3,R}$ may correspond to an image point P3, and may propagate in the direction of a wave vector $k0_{P3,R}$. A red light beam $B0_{P4,R}$ may correspond to an image point P4, and may propagate in the direction of a wave vector $k0_{P4,R}$.

A red light beam $B0_{P0,R}$ may correspond to a central image point P0, and may propagate in the direction of a wave vector $k0_{P0,R}$.

Also a blue light beam ($B0_{P1,B}$) may correspond to the image point P1, and may propagate in the direction of a wave vector ($k0_{P1,B}$).

The input light IN1 may be formed e.g. such that the direction ($k0_{P1,B}$) of propagation of the blue light beam ($B0_{P1,B}$) corresponding to a first corner point P1 of the input image IMG0 may be parallel with the direction $k0_{P1,R}$ of propagation of the red light beam $B0_{P1,R}$.

The input light IN1 may be formed e.g. such that the direction ($k0_{P2,B}$) of propagation of a blue light beam ($B0_{P2,B}$) corresponding to a second corner point P2 of the input image IMG0 may be parallel with the direction ($k0_{P2,R}$) of propagation of a red light beam ($B0_{P2,R}$), which corresponds to said second corner point P2.

The wave vector (k) of light may be defined as the vector having a direction of propagation of said light, and a magnitude given by $2\pi/\lambda$, where $\lambda$ is the wavelength of said light.

The light $B0_{P0,R}$ of the center point P0 may propagate in an axial direction ($k0_{P0,R}$). The axial direction ($k0_{P0,R}$) may be parallel with an optical axis (AX0) of the optical engine ENG1.

Figure 4A:
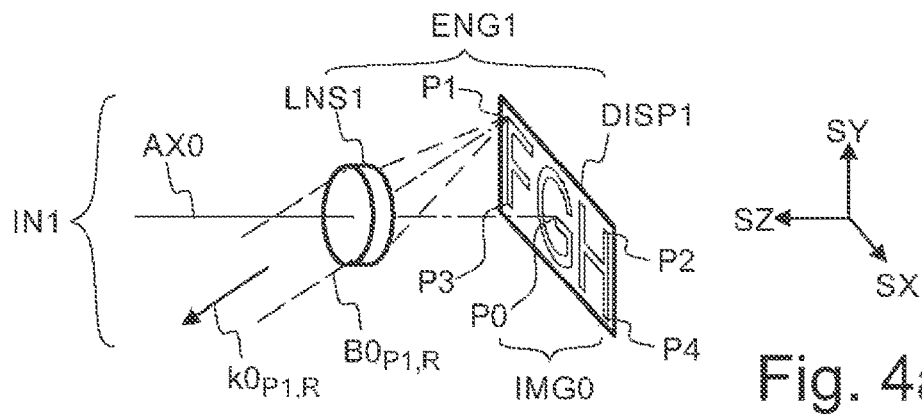
FIGS. 4a to 4e show, by way of example, in a three-dimensional view, forming input light beams by using an optical engine.
Figure 4B:
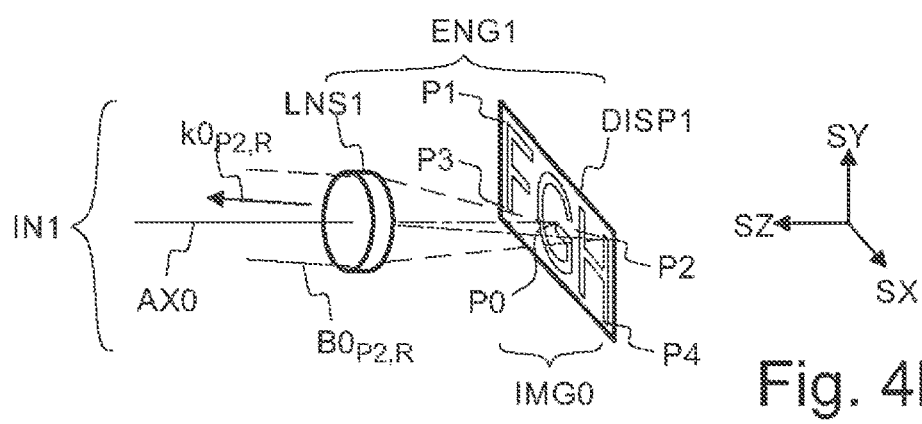
Figure 4C:
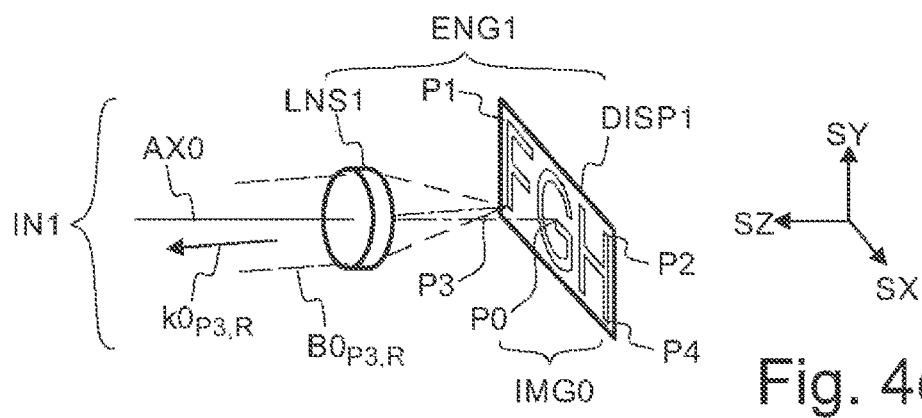
Figure 4D:
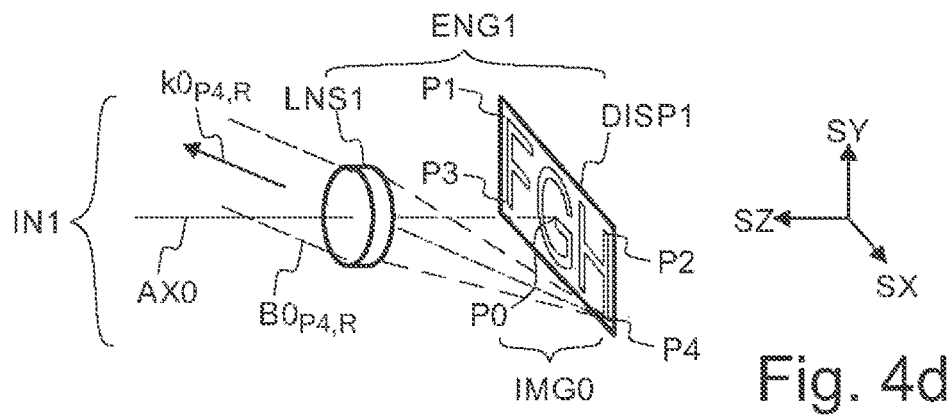
Figure 4E:
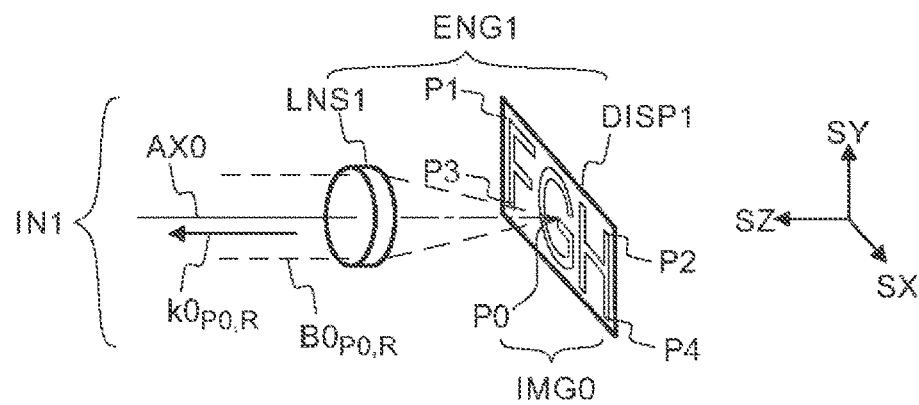
Figure 4F:
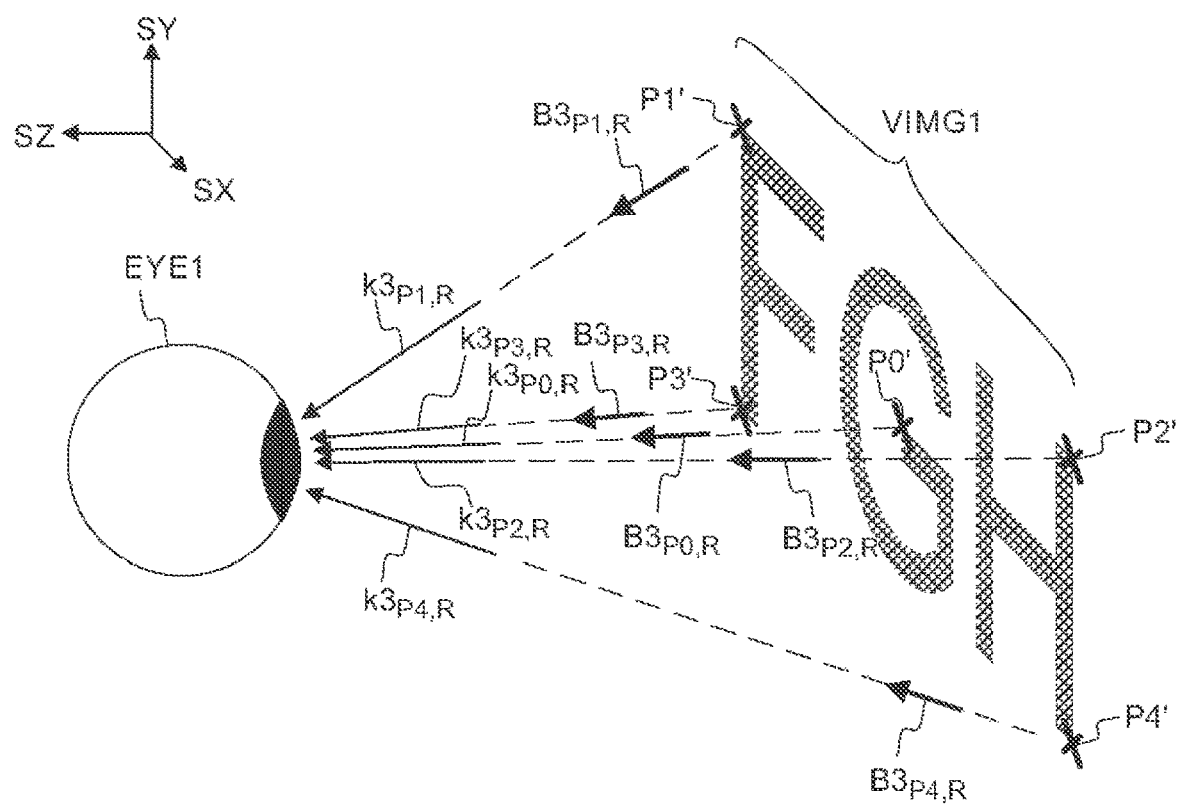
FIG. 4f shows, by way of example, in a three-dimensional view, viewing a displayed virtual image.

Referring to FIG. 4f, the output light OUT1 may comprise a plurality of output light beams $B3_{P1,R}$, $B3_{P2,R}$, ..., which may correspond to a displayed virtual image VIMG1. Each output beam $B3_{P1,R}$, $B3_{P2,R}$, ... may correspond to a point P1', P2', ... of the image. For example, a red light beam $B3_{P0,R}$ propagating in a direction of a wave vector $k3_{P0,R}$ may correspond to a point P0' of the image VIMG1. A red light beam $B3_{P1,R}$ propagating in a direction of a wave vector $k3_{P1,R}$ may correspond to a point P1' of the image VIMG1. A red light beam $B3_{P3,R}$ propagating in a direction of a wave vector $k3_{P2,R}$ may correspond to a point P2' of the image VIMG1. A red light beam $B3_{P3,R}$ propagating in a direction of a wave vector $k3_{P3,R}$ may correspond to a point P3'. A red light beam $B3_{P4,R}$ propagating in a direction of a wave vector $k3_{P4,R}$ may correspond to a point P4'.

The expander device EPE1 may form the output light OUT1 by expanding the exit pupil of the optical engine ENG1. The output light OUT1 may comprise a plurality of output light beams, which correspond to the displayed virtual image VIMG1. The output light OUT1 may impinge on the eye EYE1 of an observer such that the observer may see the displayed virtual image VIMG1.

The displayed virtual image VIMG1 may have a center point P0' and four corner points P1', P2', P3', P4'. The input light IN1 may comprise a plurality of partial light beams corresponding to the points P0, P1, P2, P3, P4 of the input image IMG0. The expander device EPE1 may form the point P0' of the displayed virtual image VIMG1 e.g. by diffracting and guiding light of the point P0 of the input image IMG0. The in-coupling element DOE1 may be arranged to diffract input light IN1 such that the guided light B1, B1a, B1b comprises light of a center point P0 of an input image IMG0. The out-coupling element DOE3, DOE3a, DOE3b may be arranged to diffract guided light B1, B1a, B1b received from the in-coupling element DOE1 such that the output light OUT1 comprises light of the center point P0.

The expander device EPE1 may form the points P1', P2', P3', P4' e.g. by diffracting and guiding light of the points P1, P2, P3, P4, respectively.

The expander device EPE1 may form output light OUT1, which comprises a plurality of light beams $B3_{P0,R}$, $B3_{P1,R}$, $B3_{P2,R}$, $B3_{P3,R}$, $B3_{P4,R}$ propagating in different directions specified by the wave vectors $k3_{P0,R}$, $k3_{P1,R}$, $k3_{P2,R}$, $k3_{P3,R}$, $k3_{P4,R}$.

A red light beam corresponding to the point P0' of the displayed virtual image VIMG1 has a wave vector $k3_{P0,R}$. A red light beam corresponding to the point P1' has a wave vector $k3_{P1,R}$. A red light beam corresponding to the point P2' has a wave vector $k3_{P2,R}$. A red light beam corresponding to the point P3' has a wave vector $k3_{P3,R}$. A red light beam corresponding to the point P4' has a wave vector $k3_{P4,R}$.

The expander device EPE1 may expand input light IN1 such that each output light beam $B3_{P1,R}$, $B3_{P2,R}$, $B3_{P3,R}$, ... may propagate in the same direction as the corresponding input light beam $B0_{P1,R}$, $B0_{P2,R}$, $B0_{P3,R}$, ... or example, the expander device EPE1 may form an output light beam $B3_{P1,R}$ from light of an input light beam $B0_{P1,R}$ such that the output light beam $B3_{P1,R}$ propagates in the same direction as the input light beam $B0_{P1,R}$. The light beams $B0_{P1,R}$, $B3_{P1,R}$ may correspond to the same point P1 of the input image IMG0. For example, the expander device EPE1 may form an output light beam $B3_{P2,R}$ from light of an input light beam $B0_{P2,R}$ such that the output light beam $B3_{P2,R}$ propagates in the same direction as the input light beam $B0_{P2,R}$. The light beams $B0_{P2,R}$, $B3_{P2,R}$ may correspond to the same point P2 of the input image IMG0.

The expander device EPE1 may be arranged to operate such that the wave vector $k3_{P1,R}$ is parallel with the wave vector $k0_{P1,R}$ of red light of the point P1 in the input light IN1. The wave vector $k3_{P0,R}$ may be parallel with the wave vector $k0_{P0,R}$ of the point P0. The wave vector $k3_{P2,R}$ may be parallel with the wave vector $k0_{P2,R}$ of the point P2. The wave vector $k3_{P3,R}$ may be parallel with the wave vector $k0_{P3,R}$ of the point P3. The wave vector $k3_{P4,R}$ may be parallel with the wave vector $k0_{P4,R}$ of the point P4.

Figure 4G:
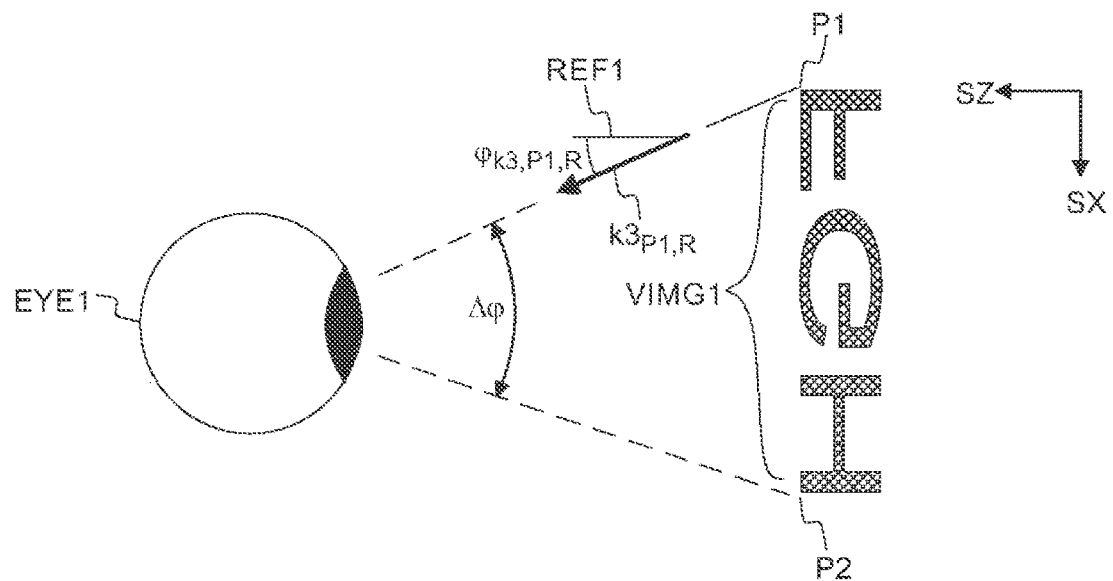
FIG. 4g shows, by way of example, angular width of the displayed virtual image.
Figure 4H:
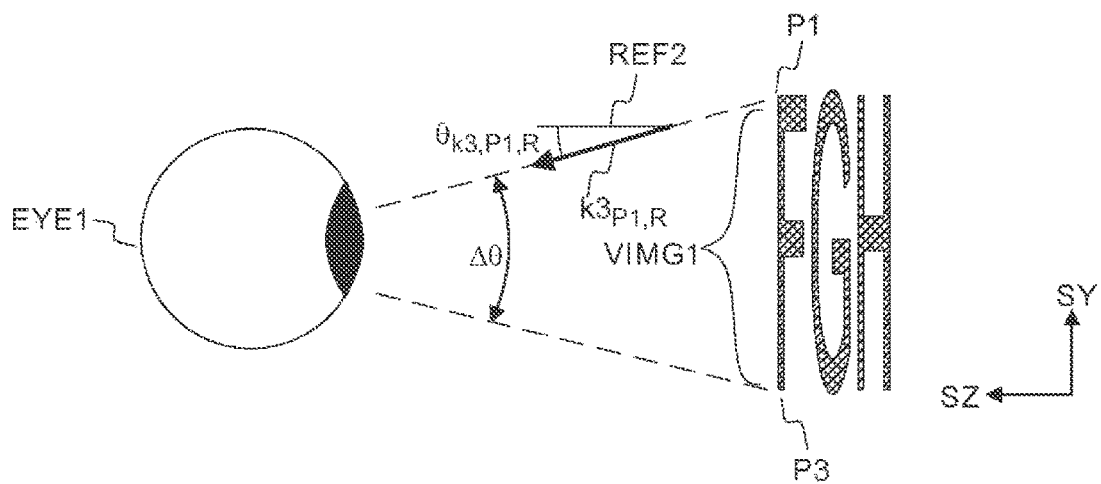
FIG. 4h shows, by way of example, angular height of the displayed virtual image.

Referring to FIGS. 4g and 4h, the displayed virtual image VIMG1 has an angular width $\Delta\varphi$ and an angular height $\Delta\theta$.

The displayed virtual image VIMG1 may have a first corner point P1' e.g. at the left-hand side of the image VIMG1, and a second corner point P2' e.g. at the right-hand side of the image VIMG1. The angular width $\Delta\varphi$ of the virtual image VIMG1 may be equal to the horizontal angle between the wave vectors $k3_{P1,R}$, $k3_{P2,R}$ of the corner points P1', P2', The displayed virtual image VIMG1 may have an upper corner point P1' and a lower corner point P3'. The angular height $\Delta\theta$ of the virtual image VIMG1 may be equal to the vertical angle between the wave vectors $k3_{P1,R}$, $k3_{P3,R}$ of the corner points P1', P3', The direction of a wave vector may be specified e.g. by orientation angles $\varphi$ and $\theta$. The angle $\varphi$ may denote an angle between the wave vector and a reference plane REF1. The reference plane REF1 may be defined e.g. by the directions SZ and SY. The angle $\theta\varphi0$ may denote an angle between the wave vector and a reference plane REF2. The reference plane REF2 may be defined e.g. by the directions SZ and SX.

Figure 4I:
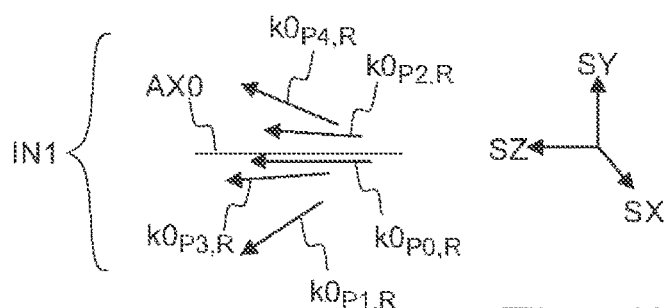
FIG. 4i shows, by way of example, wave vectors of input light beams.

Referring to FIG. 4i, the input light IN1 may comprise red light (R), green light (G) and/or blue light (B). For example, the input light IN1 may comprise blue input light beams, which have wave vectors $k0_{P0,B}$, $k0_{P2,B}$, $k0_{P3,B}$, $k0_{P4,B}$, corresponding to blue points P0, P1, P2, P3, P4 of the image IMG0. The notation $k0_{P2,B}$ may refer to the wave vector of an input light beam B0, which has blue color (B), and which corresponds to an image point P2. The expander device EPE1 may form blue output light beams from the blue input light beams such that the wave vector of each blue output light beams is parallel with the wave vector of the corresponding blue input light beam.

Figure 5:
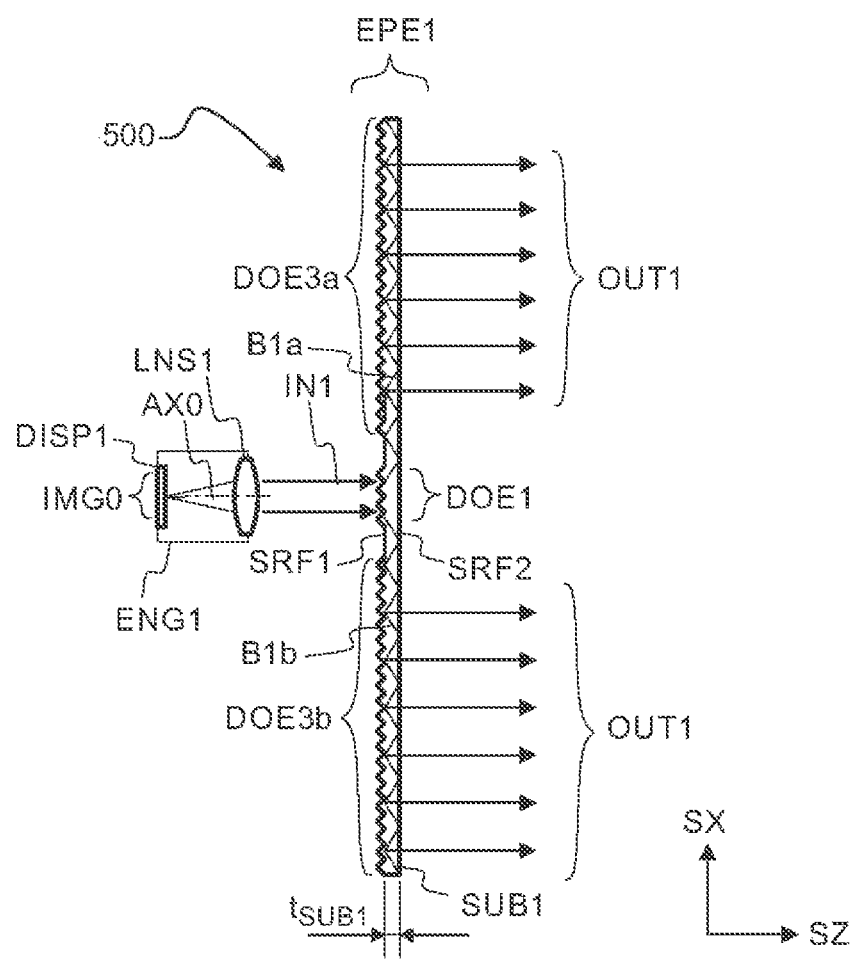
FIG. 5 shows, by way of example, in a cross-sectional side view, propagation of guided light in the waveguide plate.

Referring to FIG. 5, the optical engine ENG1 may form an input image IMG0 and may convert the input image IMG0 into a plurality of light beams of the input light IN1. The engine ENG1 may be optically coupled to the in-coupling element DOE1 of the expander EPE1. The one or more light beams provided by the engine ENG1 may be coupled to the expander EPE1 as input light IN1. The input light IN1 may be optically coupled to the in-coupling element DOE1 of the expander device EPE1.

The input image IMG0 may be represent displayed information. The input image IMG0 may be represent e.g. graphics and/or text. The input image IMG0 may be represent e.g. video. The engine ENG1 may be arranged to generate still images and/or video. The engine ENG1 may generate a real primary image IMG0 from a digital image. The engine ENG1 may receive one or more digital images e.g. from an internet server or from a smartphone.

The expander device EPE1 may carry virtual image content from the light engine ENG1 to the front of a user's eye EYE1. The expander device EPE1 may expand the viewing pupil, thus enlarging the eye box.

The engine ENG1 may comprise a micro-display DISP1 to generate an input image IMG0. The micro-display DISP1 may comprise a two-dimensional array of light-emitting pixels. The engine ENG1 may comprise e.g. one or more light emitting diodes (LED). The display DISP1 may comprise e.g. one or more micro display imagers, such as liquid crystal on silicon (LCOS), liquid crystal display (LCD), digital micromirror device (DMD). The display DISP1 may generate an input image IMG0 e.g. at a resolution of 1280×720 (RD). The display DISP1 may generate an input image IMG0 e.g. at a resolution of 1920×1080 (Full HD). The display DISP1 may generate an input image IMG0 e.g. at a resolution of 3840×2160 (4K UHD). The input image IMG0 may comprise a plurality of image points P0, P1, P2, . . . . The engine ENG1 may comprise collimating optics LNS1 to form a different light beam from each image pixel. The engine ENG1 may comprise collimating optics LNS1 to form a substantially collimated light beam from light of an image point P0. The center of the display DISP1 and the center of the optics LNS1 may together define an optical axis AX0 of the engine ENG1. The center point P0 and the center of the optics LNS1 may define the optical axis AX0.

The plate SUB1 may have a first major surface SRF1 and a second major surface SRF2. The surfaces SRF1, SRF2 may be substantially parallel with the plane defined by the directions SX and SY.

The waveguide plate SUB1 may comprise or consist essentially of transparent solid material. The plate SUB1 may comprise e.g. glass, polycarbonate or polymethyl methacrylate (PMMA). The diffractive optical elements DOE1, DOE3, DOE3$a$, DOE3$b$ may be formed e.g. by molding, embossing, and/or etching. The diffractive optical elements DOE1, DOE3, DOE3$a$, DOE3$b$ may be implemented e.g. by one or more surface diffraction gratings or by one or more volume diffraction gratings.

The elements DOE1, DOE3, DOE3$a$, DOE3$b$ may also be implemented by using reflective facets, instead of using diffraction gratings.

The waveguide plate may have a thickness $t_{SUB1}$. The waveguide plate comprises a planar waveguiding core. In an embodiment, the plate SUB1 may optionally comprise e.g. one or more cladding layers, one or more protective layers, and/or one or more mechanically supporting layers. The thickness $t_{SUB1}$ may refer to the thickness of a planar waveguiding core of the plate SUB1.

Figure 6:
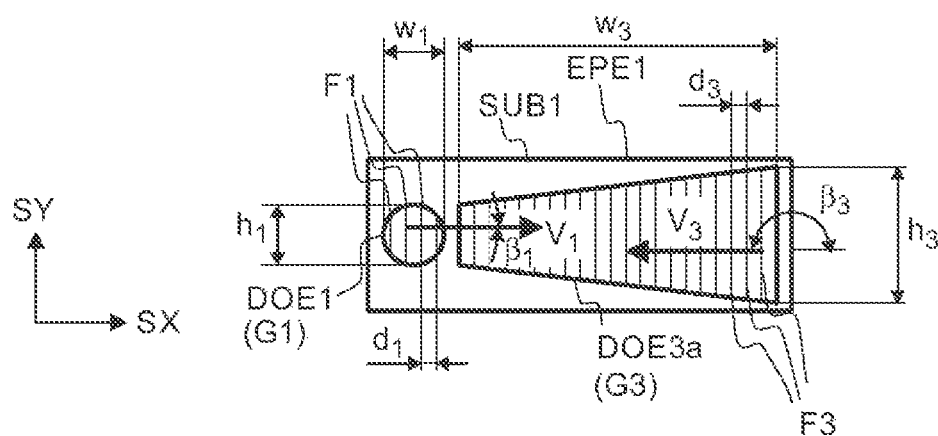
FIG. 6 shows, by way of example, in an axial view, dimensions of the expander device.

Referring to FIG. 6, each element DOE1, DOE3, DOE3$a$, DOE3$b$ may comprise one or more diffraction gratings to diffract light.

For example, the in-coupling element DOE1 may comprise one or more gratings G1. For example, the in-coupling element DOE1 may comprise one or more gratings G1$a$, G1$b$. For example, the out-coupling element DOE3 may comprise a grating G3. For example, the out-coupling element DOE3$a$ may comprise a grating G3$a$. For example, the out-coupling element DOE3$b$ may comprise a grating G3$b$.

A grating period (d) of a diffraction grating and the orientation ($\beta$) of the diffractive features of the diffraction grating may be specified by a grating vector V of said diffraction grating. The diffraction grating comprises a plurality of diffractive features (F1, F3) which may operate as diffractive lines. The diffractive features may be e.g. microscopic ridges or grooves. The diffractive features may also be e.g. microscopic protrusions (or recesses), wherein adjacent rows of protrusions (or recesses) may operate as diffractive lines. The grating vector V may be defined as a vector having a direction perpendicular to diffractive lines of the diffraction grating and a magnitude given by $2\pi/d$, where d is the grating period. The grating period means the same as the grating period length. The grating period may be the length between consecutive diffractive features of the grating. The grating period may be equal to a unit length divided by the number of diffractive features located within said unit length. The grating periods $d_1$ of the in-coupling element DOE1 may be e.g. in the range of 330 nm to 450 nm. The optimum value of a grating period d may depend e.g. on the refractive index of the plate SUB1 and on the wavelength $\lambda$ of the diffracted light.

The in-coupling element DOE1 may have a grating vector $V_1$ to form the first guided light B1, B1$a$, B1$b$. The first element DOE1 may have first diffractive features F1 to provide a grating G1 which has a grating period $d_1$ and an orientation $\beta_1$ with respect to a reference direction SX. The diffractive features may be e.g. microscopic ridges or microscopic protrusions.

The out-coupling element DOE3, DOE3$a$, DOE3$b$ may have a grating vector $V_3$ to couple the guided light B1, B1$a$, B1$b$ out of the plate SUB1. The out-coupling element DOE3, DOE3$a$, DOE3$b$ may have diffractive features F3 to provide a grating G3 which has a grating period $d_3$ and an orientation $\beta_3$ with respect to the reference direction SX.

The grating vector $V_1$ has a direction $\beta_1$ and a magnitude $2\pi/d_1$. The grating vector $V_3$ has a direction $\beta_3$ and a magnitude $2\pi/d_3$. The direction ($\beta$) of a grating vector may be specified e.g. by the angle between said vector and a reference direction (e.g. direction SX).

The grating periods (d) and the orientations ($\beta$) of the diffraction gratings of the optical elements may be selected such that the direction ($k3_{P0,R}$) of propagation of light of the center point P0 in the output light OUT1 is parallel with the direction ($k0_{P0,R}$) of propagation of light of the center point P0 in the input light IN1.

The grating periods (d) and the orientations ($\beta$) of the diffraction gratings of the optical elements DOE1, DOE3, DOE3$a$, DOE3$b$ may be selected such that the direction of each light beam of the output light OUT1 may be parallel with the direction of the corresponding light beam of the input light IN1.

The grating periods (d) and the direction ($\beta$) of the grating vectors may fulfill e.g. the condition that the vector sum $(m_1 V_1 + m_3 V_3)$ is zero for predetermined integers $m_1$, $m_3$. $V_1$ denotes a grating vector of the element DOE1. $V_3$ denotes a grating vector of the element DOE3, DOE3a, DOE3b. The value of these integers is typically +1 or −1. The value of the integer $m_1$ may be e.g. +1 or −1. The value of the integer $m_3$ may be e.g. +1 or −1.

Figure 7A:
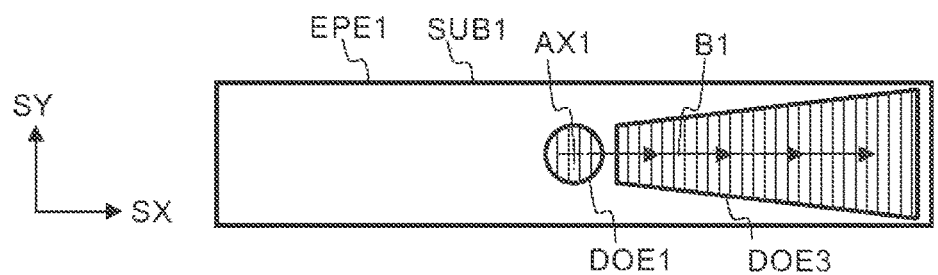
FIG. 7a shows, by way of example, in an axial view, a balanced expander device, which comprises only one out-coupling element.

Referring to FIG. 7a, the waveguide plate SUB1 may be mechanically balanced with respect to the axis AX1 of rotation, also in a situation where the waveguide plate SUB1 comprises only one out-coupling element DOE3.

Figure 7B:
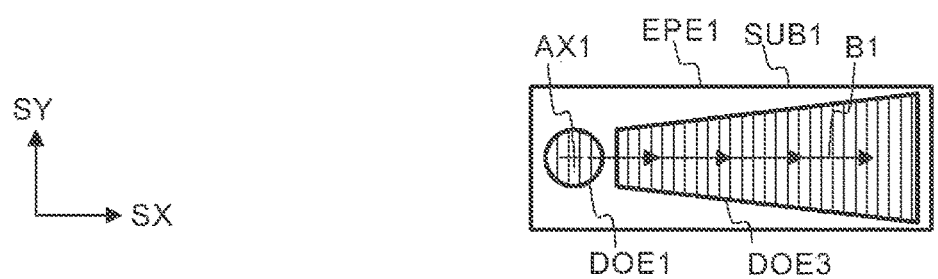
FIG. 7b shows, by way of example, in an axial view, an unbalanced expander device, which comprises only one out-coupling element.

Referring to FIG. 7b, the waveguide plate SUB1 may be asymmetric with respect to the axis AX1 of rotation.

Figure 7C:
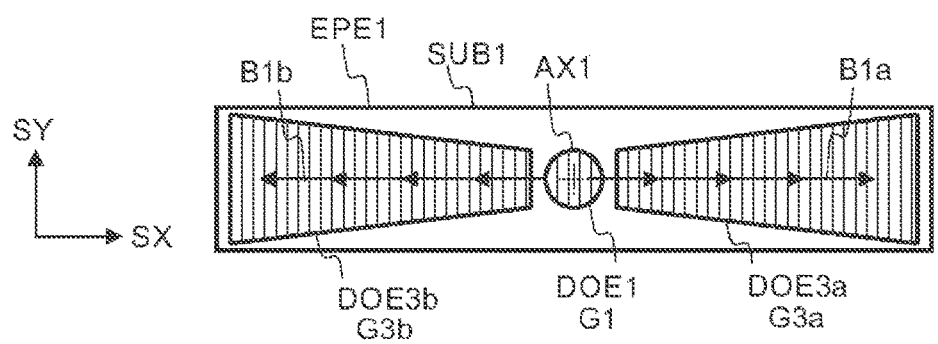
FIG. 7c shows, by way of example, in an axial view, a balanced expander device, which comprises two out-coupling elements.

Referring to FIG. 7c, the expander device EPE1 may be symmetric with respect to the axis AX1 of rotation. The expander device EPE1 may have e.g. 2-fold rotational symmetry with respect to the axis AX1. In case of 2-fold rotational symmetry, the expander device EPE1 may have two out-coupling elements DOE3 (DOE3a, DOE3b).

The in-coupling element DOE1 may form first guided light B1a and second guided light B1b by coupling input light IN1 into the waveguide plate SUB1. The expander device EPE1 may comprise a first out-coupling element DOE3a to form output light OUT1 by coupling the first guided light B1a out of the waveguide plate SUB1, and the expander device EPE1 may comprise a second out-coupling element DOE3b to form output light OUT1 by coupling the second guided light B1b out of the waveguide plate SUB1.

Rotation of the expander device EPE1 of FIG. 7c may cause lower mechanical vibration when compared with the expander device of FIG. 7b.

Rotation of the expander device EPE1 of FIG. 7c may provide a higher display refresh frequency when compared with the expander device of FIG. 7a.

Figure 7D:
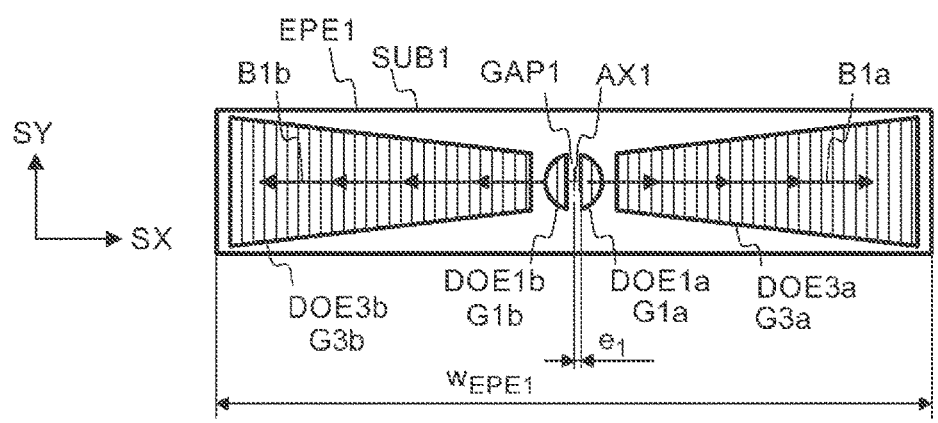
FIG. 7d shows, by way of example, in an axial view, a balanced expander device, which comprises two out-coupling elements.

Referring to FIG. 7d, the expander device EPE1 may comprise a first in-coupling element DOE1a to form first guided light B1a for the first out-coupling element DOE3a, and a second in-coupling element DOE1b to form second guided light B1b for the second out-coupling element DOE3b. The first element DOE1a may have a diffraction grating G1a. The second element DOE1b may have a diffraction grating G1b. The first element DOE1a may adjoin the second element DOE1b without a gap, i.e. the distance between the elements DOE1, DOE1b may be zero. Alternatively, the first element DOE1a may be optionally separated from the second element DOE1b by gap GAP1.

The in-coupling element DOE1 may comprise a first in-coupling element DOE1a to form first guided light B1a by coupling input light IN1 into the waveguide plate SUB1, and a second in-coupling element DOE1b to form second guided light B1b by coupling input light IN1 into the waveguide plate SUB1. The expander device EPE1 may comprise a first out-coupling element DOE3a to form output light OUT1 by coupling the first guided light B1a out of the waveguide plate SUB1, and the expander device EPE1 may comprise a second out-coupling element DOE3b to form output light OUT1 by coupling the second guided light B1b out of the waveguide plate SUB1.

The symbol $e_1$ may denote the distance between the in-coupling element DOE1a (DOE1) and the axis AX1 of rotation. The width of the gap GAP1 may be e.g. two times the distance $e_1$. The distance $e_1$ may be e.g. smaller than 5% of the width $w_{EPE1}$ of the waveguiding plate SUB1, so as to facilitate coupling of the input light IN1 to the in-coupling element DOE1a (DOE1). The distance $e_1$ may also be equal to zero. As shown in FIGS. 7a-7c, the axis AX1 of rotation may also intersect the in-coupling element DOE1. In particular, the in-coupling element DOE1 may be substantially concentric with the axis AX1.

Figure 7E:
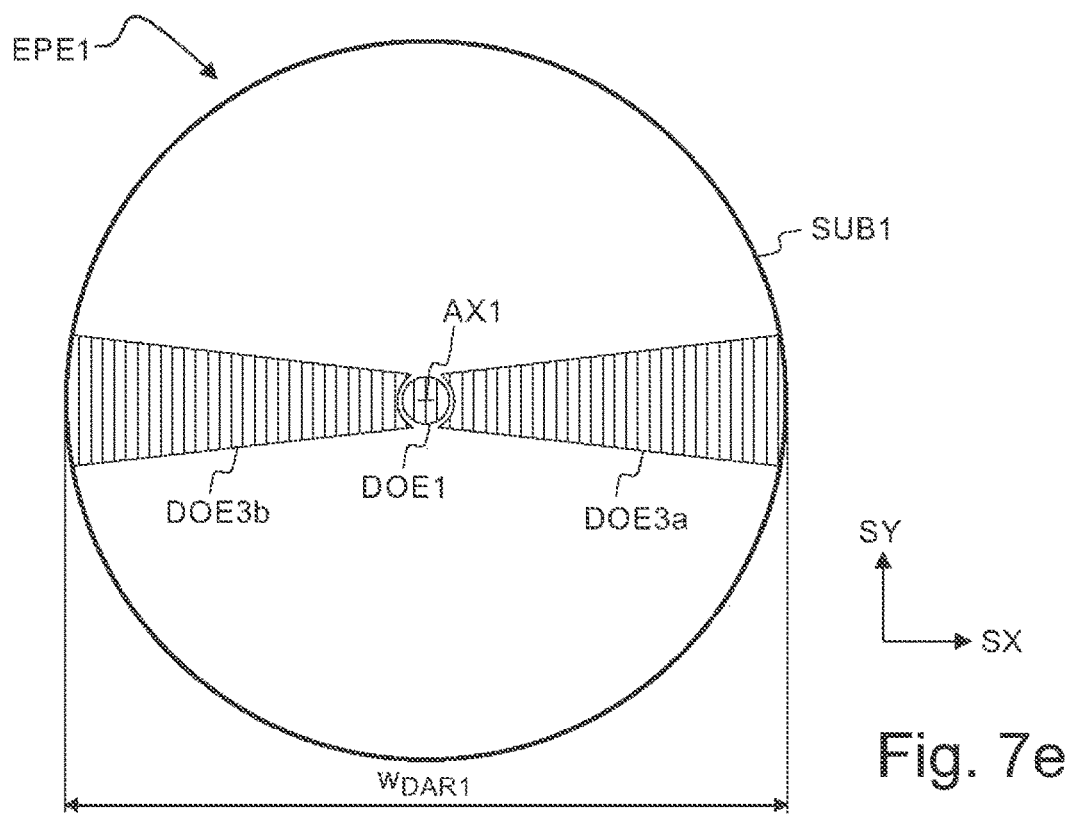
FIG. 7e shows, by way of example, in an axial view, a circular expander device, which has a circular waveguide plate.

Referring to FIG. 7e, the waveguiding plate SUB1 of the expander device EPE1 may also be circular. The circular shape may reduce acoustic noise generated by the rotating expander device EPE1, when compared with the rectangular shape of FIG. 7c. The circular shape may increase stiffness of the plate, when compared with the rectangular shape of FIG. 7c.

The expander device EPE1 may be statically balanced so that the center of gravity of the expander device EPE1 may be on the axis AX1 of rotation.

The expander device EPE1 may be dynamically balanced so that rotation about the axis AX1 does not generate any resultant centrifugal force. The expander device EPE1 may be dynamically balanced so that rotation about the axis AX1 does not generate any significant resultant centrifugal force.

The expander device EPE1 may have a symmetrical shape with respect to the axis AX1 of rotation, so as to reduce or avoid mechanical vibrations. The expander device EPE1 may have 2-fold rotational symmetry with respect to the axis AX1.

The dynamically balanced expander device EPE1 may comprise a first out-coupling element DOE3a and a second out-coupling element DOE3b on opposite sides of the in-coupling element DOE1. The in-coupling element DOE1 may form guided light (B1a) to the first out-coupling element DOE3a. The in-coupling element DOE1 may form guided light (B1b) to the second out-coupling element DOE3b.

Referring to FIGS. 8a to 8c, also the in-coupling element DOE1 may be arranged to provide output light OUT1, in addition to the out-coupling elements DOE3a, DO3b, For example, a part of the input light IN1 may be transmitted through the expander device EPE1 in the axial direction AX1. The in-coupling element DOE1 may form a central portion OUT1C of the output light OUT1 by diffracting guided light B1 out of the waveguide plate SUB1 and/or by allowing a part of the input light IN1 to pass through the expander device EPE1. Consequently, the display apparatus 500 may provide a continuous circular display region DAR1 so that the display region DAR1 does not have a dark center.

The transmitted input light IN1 may have a high intensity and the transmitted input light IN1 could cause a disturbing dazzling effect to the eye EYE1 of the user. The display apparatus 500 may be arranged to operate such that the intensity of output light OUT1C provided by the in-coupling element DOE1 is substantially equal to the effective intensity of output light OUT1 provided by the out-coupling element DOE3a, DOE3b. The display apparatus 500 may optionally comprise a filter FIL1 to attenuate the intensity of the output light OUT1C provided by the in-coupling element DOE1. The filter FIL1 may be implemented e.g. by depositing a semi-reflective layer and/or an absorbing layer on the major surface SRF2 of the expander device EPE1.

The actuating mechanism MOTOR1 may be a motor. The motor MOTOR1 and the optical engine ENG1 may be on the same side of the expander device EPE1. The display apparatus 500 may comprise a data transmission line BUS1, which is arranged to transmit image data DATA1 to the optical engine ENG1 through the motor MOTOR1.

Referring to FIG. 8b, the actuator MOTOR1 may be a motor MOTOR1, which has an inner rotating rotor ROTO1 and an outer stationary stator STAT1. The stator STAT1 may be stationary with respect to the base BASE1. The rotor ROTO1 may rotate with respect to the base BASE1. The motor MOTOR1 and the optical engine ENG1 may be positioned on the rear side of the expander device EPE1, so that the motor MOTOR1 does not block the central region of the display region DAR1. The motor MOTOR1 may be arranged to rotate the expander device EPE1 so that the motor MOTOR1 does not block the central region of the display region DAR1.

The display apparatus 500 may comprise a data transmission line BUS1, which is arranged to transmit image data DATA1 through the motor MOTOR1 to the display DISP1 of the optical engine ENG1. The display apparatus 500 may comprise a feedthrough FEED1 for transmitting image data DATA1. The feedthrough FEED1 may comprise a data transmission line BUS1, which passes through a central opening HOL1 of the motor MOTOR1. The central opening HOL1 may also accommodate a stationary supporting element CE1 for mechanically supporting the optical engine ENG1. For example, the rotor ROTO1 may have a hollow rotating shaft, which has the central opening HOL1. The stationary supporting element CE1 may pass through the central opening HOL1.

The stator STAT1 may be directly or indirectly fixed to the base BASE1. The display DISP1 may be supported such that the display DISP1 is stationary with respect to the base BASE1. The stationary supporting element CE1 may mechanically connect the optical engine ENG1 to the base BASE1 via the central opening HOL1 of the motor MOTOR1. The connecting element CE1 may be directly or indirectly connected to the base BASE1. The supporting element CE1 may keep the display DISP1 stationary with respect to the base BASE1. For example, the supporting element CE1 may be a shaft, which connects the optical engine ENG1 to the base BASE1. The central opening HOL1 may also accommodate a signal transmission line BUS1 for transmitting image data DATA1 to the display DISP1. The transmission line BUS1 may be an electrical and/or optical data transmission line. A second supporting element CE2 may transmit the rotating movement of the rotor ROT1 to the expander device EPE1. The second rotating supporting element CE2 may mechanically connect the rotating rotor ROTO1 to the rotating expander device EPE1. The supporting element CE2 may partly or completely surround the optical engine ENG1.

Referring to FIG. 8c, the actuator MOTO1 may be a motor MOTOR1, which has an outer rotating rotor ROTO1 and an inner stationary stator STAT1. The stator STAT1 may be stationary with respect to the base BASE1. The rotor ROTO1 may rotate with respect to the base BASE1. The motor MOTOR1 and the optical engine ENG1 may be positioned on the rear side of the expander device EPE1, so that the motor MOTOR1 does not block the central region of the display region DAR1. The motor MOTOR1 may be arranged to rotate the expander device EPE1 so that the motor MOTOR1 does not block the central region of the display region DAR1.

The display apparatus 500 may comprise a data transmission line BUS1, which is arranged to transmit image data DATA1 through the motor MOTOR1 to the display DISP1 of the optical engine ENG1. The transmission line BUS1 may be an electrical and/or optical data transmission line. The display apparatus 500 may comprise a feedthrough FEED1 for transmitting image data DATA1. For example, the feedthrough FEED1 may be implemented by arranging the signal transmission line BUS1 to pass through the inner stationary stator STAT1 of the motor MOTOR1. The transmission line BUS1 may pass e.g. through an opening HOL1 of the stator STAT1.

The display DISP1 may be supported such that the display DISP1 is stationary with respect to the base BASE1. The stator STAT1 may be directly or indirectly fixed to the base BASE1. A stationary supporting element CE1 may mechanically connect the optical engine ENG1 to the base BASE1 directly or via the stator STAT1. The connecting element CE1 may be directly or indirectly connected to the base BASE1. The supporting element CE1 may keep the display DISP1 stationary with respect to the base BASE1.

A second supporting element CE2 may transmit the rotating movement of the outer rotor ROT1 to the expander device EPE1. The second rotating supporting element CE2 may mechanically connect the rotating rotor ROTO1 to the rotating expander device EPE1. The supporting element CE2 may partly or completely surround the optical engine ENG1.

Figure 9A:
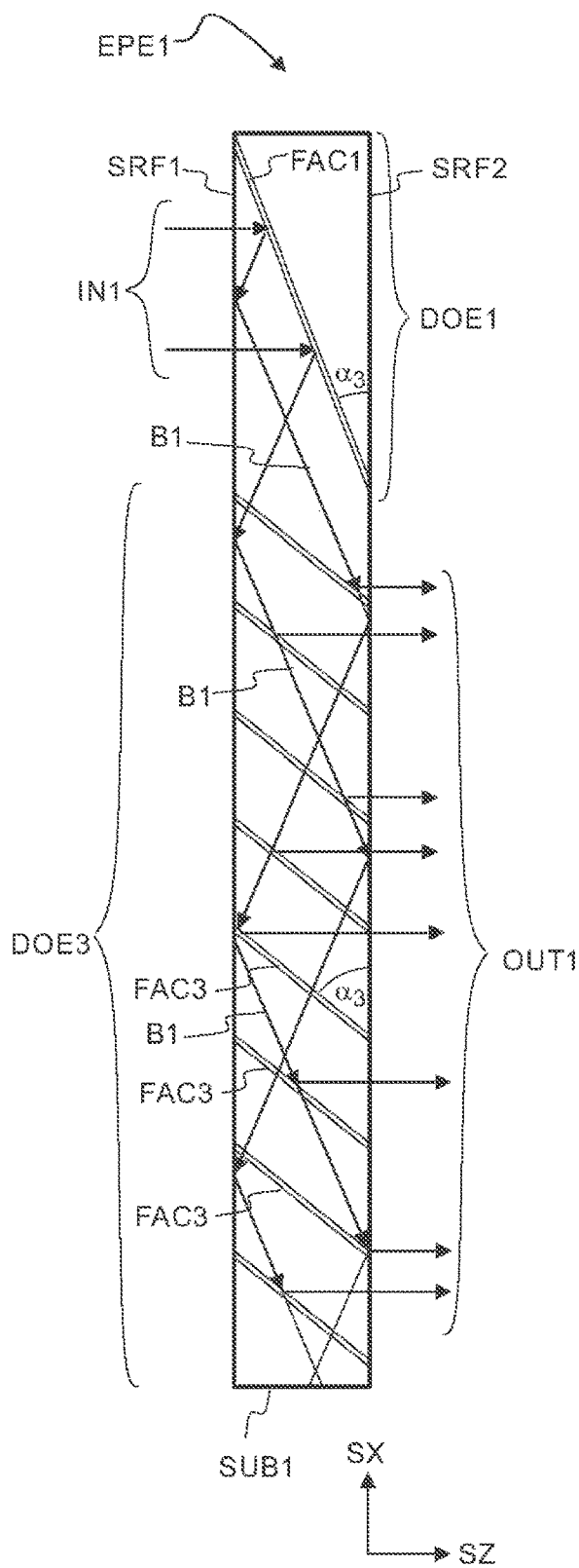
FIG. 9a shows, by way of example, in a cross-sectional side view, an expander device implemented by inclined reflective facets.
Figure 9B:
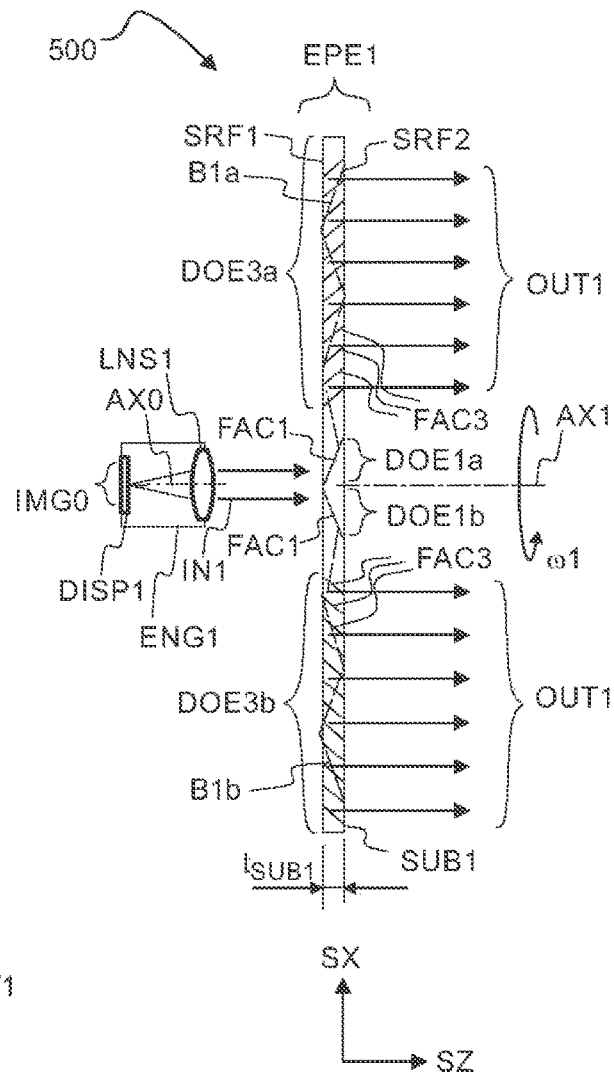
FIG. 9b shows, by way of example, in a side view, a display apparatus, wherein the expander device comprises inclined reflective facets.

Referring to FIGS. 9a and 9b, the elements DOE1, DOE3, DOE3a, DOE3b may also be implemented by using reflective facets (FAC1, FAC3), instead of using diffraction gratings (G1, G3).

The in-coupling element DOE1 may comprise one or more inclined reflective facets FAC1. The facets FAC1 may be implemented inside the waveguide plate SUB1 and/or on the surface SRF1, SRF2 of the waveguide plate SUB1.

The one or more out-coupling elements DOE3, DOE3a, DOE3b may comprise one or more inclined reflective facets FAC3. The facets FAC3 may be implemented inside the waveguide plate SUB1 and/or on the surface SRF1, SRF2 of the waveguide plate SUB1. In particular, the facets FAC3 may be semi-reflective semi-transparent inclined planar facets, which are embedded in the waveguide plate SUB1. The waveguide plate SUB1 may comprise cascaded inclined partial mirrors FAC3, which reflect guided light B1, B1a, B1b out of the waveguide plate SUB1.

The orientation of the one or more facets FAC1 may be specified e.g. by an inclination angle $\alpha_1$. The orientation of the facets FAC3 may be specified e.g. by an inclination angle $\alpha_3$. Referring to the light beams shown in FIGS. 4a-4i, the inclination angles $\alpha_1$, $\alpha_3$ of the reflective facets FAC1, FAC3 may be selected such that the directions of the output light beams ($B3_{P1,R}$, $B3_{P2,R}$) correspond to the directions of the input light beams ($B0_{P1,R}$, $B0_{P2,R}$). In addition, the inclination angles $\alpha_1$, $\alpha_3$ may be selected so that the guided light representing the displayed virtual image VIMG1 may be confined to the waveguide plate SUB1 by total internal reflection. The inclined facets FAC1, FAC3 are not perpendicular and not parallel with the major surfaces SRF1, SRF2 of the waveguide plate SUB1.

The directions of the output light beams ($B3_{P1,R}$, $B3_{P2,R}$) may correspond to the directions of the input light beams ($B0_{P1,R}$, $B0_{P2,R}$). Consequently, the displayed image VIMG1 may comprise image points P0', P1', P2', P3', P4 corresponding to the image points P0, P1, P2, P3, P4 of the input image IMG0.

Referring to FIG. 9b, the expander device EPE1 may comprise a first in-coupling element DOE1a to form first guided light B1a by coupling input light IN1 into the waveguide plate SUB1, and a second in-coupling element DOE1b to form second guided light B1b by coupling input light IN1 into the waveguide plate SUB1. The first in-coupling element DOE1a may comprise one or more (first) inclined facets FAC1. The second in-coupling element DOE1b may comprise one or more (second) inclined facets FAC1. The expander device EPE1 may comprise a first out-coupling element DOE3a to form output light OUT1 by coupling the first guided light B1a out of the waveguide plate SUB1. The expander device EPE1 may comprise a second out-coupling element DOE3b to form output light OUT1 by coupling the second guided light B1b out of the waveguide plate SUB1. The first out-coupling element DOE3a may comprise one or more (third) inclined facets FAC3. The second out-coupling element DOE3b may comprise one or more (fourth) inclined facets FAC3.

In general, the optical engine ENG1 may also be provided separate from the display apparatus 500. The optical engine ENG1 may be a replaceable part of the display apparatus 500. The display apparatus 500 may also be delivered without an optical engine ENG1. The display apparatus 500 may comprise an expander device EPE1 and a rotating mechanism also without the optical engine ENG1. The optical engine ENG1 may be mounted to the display apparatus 500 e.g. at a service site or by the user USER1. In an embodiment, a first optical engine ENG1 may be replaced with a second optical engine. A vehicle-mounted display apparatus 500 may also be delivered without an optical engine ENG1. The optical engine ENG1 may be mounted to the display apparatus 500 e.g. at a service site or by the user USER1.

For some applications, also a low refresh rate may be used. The resulting flickering may be used e.g. as special effect to catch attention of the viewer. For example, the expander device may comprise two out-coupling elements, and the expander device may be rotated at the rotation speed of 5 revolutions per second. In that case, the refresh rate may be equal to 2×5 pulses per second=10 pulses per second. The refresh rate of 10 light pulses per second or lower may be used for displaying information in a flashing manner, so as to catch attention of the viewer. The rotation speed of the expander device may be e.g. in the range of 1 to 5 revolutions per second, to provide a flashing effect.

In an embodiment, the expander device may also be arranged to oscillate in a reciprocating manner. For example, the expander device may be rotated less than 180° in a clockwise direction, after which that expander device may be rotated less than 180° in a counter-clockwise direction.

For the person skilled in the art, it will be clear that modifications and variations of the devices and methods according to the present invention are perceivable. The figures are schematic. The particular embodiments described above with reference to the accompanying drawings are illustrative only and not meant to limit the scope of the invention, which is defined by the appended claims.

What is claimed is:

1. A display apparatus (500) for displaying a virtual image (VIMG1), the display apparatus (500) comprising an expander device (EPE1) to form light beams ($B3_{P1,R}$, $B3_{P2,R}$) of output light (OUT1) by expanding light beams ($B0_{P1,R}$, $B0_{P2,R}$) of input light (IN1), the expander device (EPE1) comprising a waveguide plate (SUB1), an in-coupling element (DOE1) to form guided light (B1) by coupling input light (IN1) into the waveguide plate (SUB1), and an out-coupling element (DOE3) to form output light (OUT1) by coupling the guided light (B1) out of the waveguide plate (SUB1), wherein the display apparatus (500) comprises a base (BASE1) and an actuating mechanism (MOTOR1) to cause rotary and/or oscillatory motion of the waveguide plate (SUB1) with respect to the base (BASE1);
wherein the actuating mechanism (MOTOR1) is arranged to rotate the expander device (EPE1) so that the rotation speed ($f_{RPM}$) of the expander device (EPE1) is in the range of 5 to 200 revolutions per second.

2. The display apparatus (500) of claim 1, wherein the actuating mechanism (MOTOR1) is arranged to rotate the waveguide plate (SUB1) about an axis (AX1) of rotation, wherein a distance ($e_1$) between the in-coupling element (DOE1) and the axis (AX1) of rotation is smaller than 5% of the width ($w_{EPE1}$) of the waveguide plate (SUB1).

3. The display apparatus (500) of claim 1, wherein the actuating mechanism (MOTOR1) is arranged to rotate the waveguide plate (SUB1) about an axis (AX1) of rotation, and wherein the waveguide plate (SUB1) is balanced with respect to the axis (AX1) of rotation.

4. The display apparatus (500) of claim 1, further comprising a protective cover (502) to prevent mechanical contact with the expander device (EPE1), wherein the protective cover (502) allows viewing of the displayed image (VIMG1) through the protective cover (502).

5. The display apparatus (500) of claim 1, comprising an optical engine (ENG1) to form an input image (IMG0) and to convert the input image (IMG0) into a plurality of input light beams ($B0_{P1,R}$, $B0_{P2,R}$) of the input light (IN1), wherein the expander device (EPE1) is arranged to form light beams ($B3_{P1,R}$, $B3_{P2,R}$) of output light (OUT1) by expanding the input light beams ($B0_{P1,R}$, $B0_{P2,R}$) of the input light (IN1).

6. The display apparatus (500) of claim 5, wherein the actuating mechanism (MOTOR1) is a motor, the motor (MOTOR1) and the optical engine (ENG1) are on the same side of the expander device (EPE1), wherein the display apparatus (500) comprises a data transmission line (BUS1), which is arranged to transmit image data (DATA1) to the optical engine (ENG1) through the motor (MOTOR1).

7. The display apparatus (500) of claim 1, wherein the in-coupling element (DOE1) is arranged to form a central portion (OUT1C) of the output light (OUT1) by diffracting guided light (B1) out of the waveguide plate (SUB1) and/or by allowing a part of the input light (IN1) to pass through the expander device (EPE1).

8. The display apparatus (500) of claim 1, wherein the in-coupling element (DOE1) comprises one or more diffraction gratings (G1, G1a, G1b) and wherein the out-coupling element (DOE3, DOE3a, DOE3b) comprises one or more diffraction gratings (G3, G3a, G3b).

9. The display apparatus (500) of claim 5, wherein the in-coupling element (DOE1) comprises one or more reflective facets (FAC1) and wherein the out-coupling elements (DOE3, DOE3a, DOE3b) comprises one or more reflective facets (FAC3).

10. The display apparatus (500) of claim 1, comprising a first in-coupling element (DOE1a) to form first guided light (B1a) by coupling input light (IN1) into the waveguide plate (SUB1), and a second in-coupling element (DOE1b) to form second guided light (B1b) by coupling input light (IN1) into the waveguide plate (SUB1), wherein the expander device (EPE1) comprises a first out-coupling element (DOE3a) to form output light (OUT1) by coupling the first guided light (B1a) out of the waveguide plate (SUB1), and wherein the expander device (EPE1) comprises a second out-coupling element (DOE3b) to form output light (OUT1) by coupling the second guided light (B1b) out of the waveguide plate (SUB1).

11. A vehicle (1000), comprising the display apparatus (500) of claim 1.

12. The vehicle (1000) of claim 11, comprising a semi-transparent reflective window (WIN1), wherein the window (WIN1) is arranged to display the virtual image (VIMG1) by reflecting the output light (OUT1) formed by the expander device (EPE1).

13. The vehicle (1000) of claim 12, comprising a semi-transparent reflective window (WIN1), wherein the window (WIN1) and the display apparatus (500) allow observing an external object (OBJ1) through the window (WIN1) from an eye box (BOX1) so that the displayed virtual image (VIMG1) visually overlaps the external object (OBJ1).

14. A method for displaying a virtual image (VIMG1) using a display apparatus, the display apparatus (500) comprising an expander device (EPE1) to form light beams ($B3_{P1,R}$, $B3_{P2,R}$) of output light (OUT1) by expanding light beams ($B0_{P1,R}$, $B0_{P2,R}$) of input light (IN1), the expander device (EPE1) comprising a waveguide plate (SUB1), an in-coupling element (DOE1) to form guided light (B1) by coupling input light (IN1) into the waveguide plate (SUB1), and an out-coupling element (DOE3) to form output light (OUT1) by coupling the guided light (B1) out of the waveguide plate (SUB1), wherein the display apparatus (500) comprises a base (BASE1) and an actuating mechanism (MOTOR1) to cause rotary and/or oscillatory motion of the waveguide plate (SUB1) with respect to the base (BASE1); wherein the actuating mechanism (MOTOR1) is arranged to rotate the expander device (EPE1) so that the rotation speed ($f_{RPM}$) of the expander device (EPE1) is in the range of 5 to 200 revolutions per second;

wherein the method comprises: providing a plurality of input light beams ($B0_{P1,R}$, $B0_{P2,R}$) of input light (IN1) such that the input light beams ($B0_{P1,R}$, $B0_{P2,R}$) correspond to image points (P1, P2) of an input image (IMG0), forming light beams ($B3_{P1,R}$, $B3_{P2,R}$) of output light (OUT1) by using an expander device (EPE1) to expand the input light beams ($B0_{P1,R}$, $B0_{P2,R}$) of the input light (IN1), and causing a rotary and/or an oscillatory motion of the expander device (EPE1).

\* \* \* \* \*